United States Patent
Schlekewey et al.

(10) Patent No.: US 6,181,276 B1
(45) Date of Patent: Jan. 30, 2001

(54) SECTOR SHAPING TRANSITION SYSTEM AND METHOD

(75) Inventors: Joel Schlekewey, Seattle; Martin J. Feuerstein, Redmond, both of WA (US)

(73) Assignee: Metawave Communications Corporation, Redmond, WA (US)

(*) Notice: Under 35 U.S.C. 154(b), the term of this patent shall be extended for 0 days.

(21) Appl. No.: 09/169,489

(22) Filed: Oct. 9, 1998

(51) Int. Cl.⁷ ...................................................... H01G 3/24
(52) U.S. Cl. ............................ 342/372; 342/81; 342/373; 342/374
(58) Field of Search ............................... 342/81, 154, 372, 342/373, 374

(56) References Cited

U.S. PATENT DOCUMENTS

| | | | |
|---|---|---|---|
| 5,428,817 | 6/1995 | Yahagi et al. | 455/33.3 |
| 5,485,631 | 1/1996 | Bruckert | 455/33.3 |
| 5,565,873 | 10/1996 | Dean | 342/372 |
| 5,584,049 | 12/1996 | Weaver, Jr. et al. | 455/67.1 |
| 5,596,333 | 1/1997 | Bruckert | 342/457 |
| 5,666,123 | 9/1997 | Chrystie | 342/373 |
| 5,684,491 | 11/1997 | Newman et al. | 342/374 |

FOREIGN PATENT DOCUMENTS

| | | | |
|---|---|---|---|
| 0639035 | 2/1995 | (EP) | H04Q/7/36 |
| 9522210 | 8/1995 | (WO) | H04B/7/26 |

*Primary Examiner*—Thomas H. Tarcza
*Assistant Examiner*—Dao L. Phan
(74) *Attorney, Agent, or Firm*—Fulbright & Jaworski L.L.P.

(57) ABSTRACT

Systems and methods are disclosed for providing transition between sector configurations of a multi-sectored cell wherein the subscriber units may detect the impending change in sector configuration and react accordingly. Sector transitions accomplished according to the present invention include the use of time dithering old and new sector signals on antenna beams of the transition area, amplitude tapering of old and new sector signals on antenna beams of the transition area, blending of sector signals on antenna beams of the transition area, phase adjustment of antenna beams of the transition area, as well as combinations thereof. Accordingly, subscriber units in the transition area are able to detect the impending sector reconfiguration and react in order to avoid degradation or loss of communication.

75 Claims, 8 Drawing Sheets

SECTOR SHAPING TRANSITION SYSTEM AND METHOD

RELATED APPLICATIONS

Reference is hereby made to the following co-pending and commonly assigned U.S. Patent applications: METHOD AND APPARATUS FOR IMPROVED CONTROL OVER CELLULAR SYSTEMS, Ser. No. 08/582,525 filed Jan. 3, 1996; ANTENNA DEPLOYMENT SECTOR CELL SHAPING SYSTEM AND METHOD, Ser. No. 08/786,725 filed Jan. 27, 1997; ANTENNA DEPLOYMENT SECTOR CELL SHAPING SYSTEM AND METHOD, Ser. No. 08/924,285 filed Sep. 5, 1997; and INPUT SPECIFIC INDEPENDENT SECTOR MAPPING, Ser. No. 08/970,121 filed Nov. 13, 1997; the disclosures of which applications are incorporated herein by reference.

TECHNICAL FIELD OF THE INVENTION

This invention relates to sectorized cellular communication systems and more particularly to a system and method for providing transition between adjustable sector configurations within a multiple sector cell.

BACKGROUND OF THE INVENTION

As cellular communications become more widely used, the number of individual users and calls multiplies. Increase in cellular communications utilization magnifies the opportunity for interference between the different users on the cellular system. Such interference is inevitable because of the large number of users and the finite number of cellular communications cells (cells) and frequency bands, time divisions, and/or identifying codes (collectively referred to herein as channels, although the use of frequency bands of frequency division multiple access (FDMA), time slots of time division multiple access (TDMA), pseudo random codes of code division multiple access (CDMA), and the like may be utilized in distinguishing "channels") available.

As originally implemented, cellular communications systems have been broken down into omni-trunks where each cell was able to use each channel in a 360° radius. Because of overlap in the area serviced by cells, a caller utilizing one cell in the penumbra between two cells could interfere with a caller utilizing the other cell if both were on the same channel. To avoid this interference the channel utilized by a caller in one cell would have to be disabled for any other callers in any adjacent cells. Disabling such a channel on all adjacent cells would cause many more cells than actually utilized to have the caller's channel unavailable for use by other callers. Such disabling of channels to avoid interference was recognized to lead to under-utilization of cell resources as well as depletion of available channels.

In order to avoid such under-utilization, reuse patterns were adopted in the art wherein different channel sets are assigned to different cells so that callers in adjacent cells tend not to utilize the same channel concurrently. Problems with such reuse patterns, however, include difficulty in creating a cell reuse pattern utilizing channels in such a way as not to have any two cells' use of a channel overlap, as well as limitations on the number of channels available for use in implementing such a reuse pattern.

In a code division multiple access (CDMA) system, the users are separated from one another by using different codes and/or different time delays of the same code while utilizing the same frequency band. Because of this use of the same frequency band, there is a potential, as the system becomes loaded with a number of users, of heavy traffic interference between one user and another limiting the capacity of the system. There are certain problems that are inherent to CDMA networks including interference from one cell to another, since typically every cell reuses the same frequency. The forward link (transmission from a cell site to a subscriber station) at any particular subscriber unit's location may receive interference from a number of cells. Some of those would be desired cells that the subscriber unit would be in handoff with. Others would be cells that the subscriber unit could not be in handoff with, but that would interfere with the signal that the subscriber unit was receiving. An analogous problem happens on the reverse link (transmission from the subscriber station to the cell site), where a cell site receives signals from subscriber units that are within the coverage area of that sector, as well as from subscriber units that are being served by other cells. Interferences of this type limit the capacity of a given sector.

To reduce the interference problems caused by other users in the omni cell 360° configuration, cells have also been broken down into 120° sectors such that each channel available at the cell only communicates in an area of 120° radial coverage about the cell, i.e. sectorized cells. However, a problem with going from the omni cell 360° configuration to the sector system is that, as a result of splitting of the cell into 120° sectors, only a third of the channels are available in each sector. This results in a reduced total call capacity in any particular cell sector as compared to that available in the omni cell 360° configuration. This is because if all of the channels in a particular sector are currently being utilized by users, a channel available in another sector in that same cell may not be available for utilization by a new caller located in the loaded sector. For example, if an omni cell has 60 channels and a sector system is divided into three 120° sectors, each sector only has 20 channels. If in sector 1 there are 20 channels being used and a twenty-first user attempts to gain access, this user will not have access to the cell because of a lack of available channels in the sector. Whereas, in the omni cell 360° configuration, the twenty-first user would have had access to the cell because all channels are by definition potentially available throughout the cell.

Of course one solution might be to add to the total number of channels at the cell. However, this solution is undesirable in that the addition of channels further complicates establishing cell re-use patterns. Furthermore, as the number of channels per sector increases, the possibility of interference events also increases.

Likewise, the addition of channels increases the energy density within the cell and thus reduces the carrier to interference ratio which results in poorer signal quality. For example, in a CDMA system, which is interference limited, additional codes (channels) may be utilized in a sector in order to provide capacity enough to handle calls originating therein, however signal degradation will be experienced. Accordingly, it is preferable to limit the number of codes, and therefore the number of subscriber units serviced, within a sector to a number for which a desired communication quality may be maintained.

It shall be appreciated that loading of sectors is often cyclic or dynamic in nature rather than constant. For example, during certain times of day, such as business commuting times, a particular sector, such as a sector encompassing an urban highway, may service more users than during other times of day. Therefore, during particular times a particular sector or sectors may require increased capacity in order to service all users whereas at other times the cell's capacity might be better utilized when spread more homogeneously throughout the cell's coverage area.

It would, therefore, be advantageous to make more efficient use of cellular capacity by being able to make sectors dynamically shapable in order to provide increased capacity to a particular area within the cell's radiation pattern. This can be done by making more channels potentially available to that particular area, without actually increasing the total number of channels within the cell or the individual cell sectors. Ideally, the shapable sectors will be composed of narrow beams so as to provide a convenient means by which sectors may be sized radially about the cell. Systems implementing such narrow beams are described in U.S. Pat. No. 5,563,610, entitled "NARROW BEAM ANTENNA SYSTEM WITH ANGULAR DIVERSITY," incorporated herein by reference. Management of such a system, including concurrent beam and channel management within a neighborhood of cells, is disclosed in the above referenced co-pending and commonly assigned U.S. Patent application entitled "METHOD AND APPARATUS FOR IMPROVED CONTROL OVER CELLULAR SYSTEMS."

However, in a system providing shapable sectors, it is desirable to provide for the dynamic adjustment of such sectors without detrimentally affecting communications. Specifically, dynamic adjustment of a sector should not result in dropped communications as areas of sector influence are changed. For example, where wireless communication is in progress in a sector which is to have its shape altered, i.e., its area of influence adjusted, it is typically desirable to maintain communication with that subscriber unit throughout reshaping of the sector. Maintaining such communications may require serving the subscriber unit as if it were in the area of influence of the reshaped sector although the new area of influence no longer encompasses the subscriber unit, causing a handoff of the subscriber unit to a different sector having a new area of influence encompassing the subscriber unit, or the like.

A need therefore exits in the art for a system and method for dynamically adjusting the shape of cell sectors to provide for greater trunking efficiency and the ability to serve more users. A further need in the art exists for dynamic transition of the cell sector shapes to be provided in a manner so as to not detrimentally affect communications serviced during the transition.

SUMMARY OF THE INVENTION

These and other objects, features and technical advantages are achieved by a system and method which smoothly transitions between various sector configurations available at a cell. An objective of the system and method of the present invention is to avoid abrupt changes in the sector configuration of a cell that may cause disruptions in service to subscriber units in the communication network. Therefore, according to the present invention, sector transitions are softened, i.e., faded-in, such that subscriber units may detect the changing sector configuration and react accordingly. Thus, the subscriber units are not adversely affected, such as by dropped calls, poor voice quality, failed call originations, and the like, by the changes in sector configurations.

The softened sector transitions are preferably accomplished according to the present invention by techniques including dithering, blending, tapering, and adjusting of signals associated with narrow antenna beams or other adaptive antenna patterns used to synthesize the desired sectors. Accordingly, in a preferred embodiment of the present invention time dithering is used to soften the transition between sector configurations. When time dithering is utilized according to the present invention with narrow antenna beams synthesizing sectors, sector signals are broadcast from the narrow antenna beams in rapid time dithering to "ping-pong" back and forth between the old sector configuration and the new sector configuration to allow subscriber units sufficient time to observe and react to the new sector configuration. Time dithering according to this preferred embodiment involves alternately transmitting one sector signal, then another sector signal, on a single antenna beam. To further soften the transition, during the transition period the dwell times on the sectors may be gradually increased for the new sector and reduced for the old sector. The alternative method which may be employed is to keep the dwell time constant throughout the transition process.

An alternative embodiment of the present invention utilizes amplitude tapering to soften the transition between sector configurations. When amplitude tapering is utilized according to the present invention with narrow antenna beams synthesizing sectors, sector signal amplitude levels for the new sector are gradually increased, while sector signal amplitude levels for the old sector are reduced. The use of gradual amplitude tapering allows subscriber units sufficient time to observe and react to the new configuration.

Another alternative embodiment of the present invention utilizes sector blending to soften the transition between sector configurations. When sector blending is utilized according to the present invention with narrow antenna beams synthesizing sectors, multiple sector signals are simultaneously transmitted on a single antenna beam to allow subscriber units sufficient time to observe and react to the new sector configuration. Accordingly, sector blending is, in effect, "simulcasting" multiple sectors on particular antenna beams during the transition period.

Another alternative embodiment of the present invention utilizes phase adjustment to soften the transition between sector configurations. When phase adjustment is utilized according to the present invention with narrow antenna beams used to synthesize sectors, varying antenna patterns, having desired nulls and/or peaks, are used to aid the sector transitioning. Through the use of phase adjustments between signals of the various antenna beams of a sector, i.e., vector control, it is possible to steer a null for a particular sector in the direction of the transition area in order to facilitate handoffs required to complete the sector transition without dropped calls.

It shall be appreciated that, although described in the alternative, the sector transition techniques of the present invention may be used in combination to provide soft sector transitioning. For example combinations of time dithering and amplitude tapering may be used to gradually adjust amplitude levels of the sectors in combination with "ping-ponging" a sector's signal back and forth between the old and new sector configuration. The time dithering of this combined technique may include switching sectors back and forth and/or switching gain levels back and forth.

A technical advantage of the present invention is that, as loading of a cell changes during operation, so too can the configuration of the cell's sectors, such as adjusting sector azimuth pointing angles and/or sector beamwidths, be dynamically adjusted to meet these changes in loading without causing undesired effects to on-going communications during the sector reconfiguration. A further technical advantage of the present invention is that the sector transition technique may be selected from various techniques or combinations of techniques in order to provide a softened reconfiguration of sectors most desirable for the communications supported by the network or then being serviced by the cell. For example, where subscriber units are in communication with a base transceiver unit (BTS) of a cell using CDMA technology, the use of the above described sector blending transition technique may be desired as the loading of CDMA subscriber units are interference limited and the increased energy due to the blended sectors may be utilized to trigger the desired handoff requests by the subscriber units. Where subscriber units, such as analogue units, or digital units using TDMA or GSM, are in communication with a BTS of a cell, the use of the above described combination of time dithering and amplitude techniques may be desired in order to trigger a handoff request by the subscriber unit, based on the unit detecting loss of sector signal, without causing call quality to drop below a desired threshold and without causing the call to be dropped.

It shall be appreciated that the above described techniques are not limited to use in any particular communication scheme, i.e., FDMA, TDMA, CDMA, and may be utilized for any communication scheme or standard. Of course, the transition techniques of the present invention may be utilized in combination with other control techniques including BTS or mobile switching office (MSO) subscriber unit control, such as to control handoff of a subscriber unit to another sector or cell of the communication network.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DESCRIPTION OF THE PREFERRED EMBODIMENTS

It shall be appreciated that wireless communication services utilize a variety of schemes for providing comprehensive coverage of an area while providing sufficient communication capacity without an undesired level of interference from simultaneous subscriber units. These schemes include the use of particular antenna radiation patterns including sectorization, frequency re-use patterns, and multiple access techniques, such as FDMA, TDMA, and CDMA.

Figure 1:
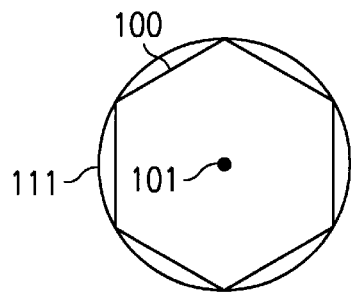
FIG. 1 illustrates an omni directional cellular radiation pattern.

Directing attention to FIG. 1, a cellular system including cell 100 having antenna structure 101 radiating and/or receiving signals omni directionally as radiation pattern 111 is shown. Here, a particular channel or set of channels may be assigned for use in cell 100, thus allowing a different set of channels to be used in a neighboring cell (not shown). Accordingly, a large geographic area may be serviced while providing simultaneous communication to multiple users, i.e., a user may utilize a channel assigned to cell 100 anywhere throughout radiation pattern 111 while a user in another cell simultaneously uses a channel associated with that other cell.

Figure 2A:
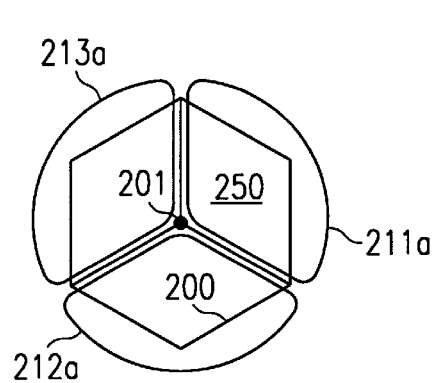
FIGS. 2A and 2B illustrate three sectored cellular radiation patterns.

However, to provide improved signals and/or more capacity, a region of a wireless communication area may be subdivided. For example, directing attention to FIG. 2A, a sectored cellular system, which includes cell 200 having antenna structure 201 radiating and/or receiving signals in three sectors as radiation patterns 211a, 212a, and 213a, is shown. Where sector signals are associated with the radiation patterns, such as an α, β, and γ sector associated with radiation patterns 211a, 212a, and 213a respectively, the cell of FIG. 2A is a sector trunk cell site wherein the available channels are divided among the sectors. Therefore, a given channel can be utilized only within one sector of the cell site. In the case of the three sectored system illustrated, channel use is limited to a 120° radius about the cell site.

Utilization of the sectored cell site provides for greater re-use of channels as adjacent cell sites may be disposed to provide sectors using the same channels which do not overlap. Likewise, due to limiting radiation of particular signals to within a sector in which the subscriber unit is located, energy densities within the sectors is lowered providing improved signal to noise conditions and, thus, improved capacity. However, it shall be appreciated that this greater channel re-use is at the cost of reduced channel availability in any particular sector. For example, where 60 channels are used in an omni trunk cell site, 60 channels are available at any point within the cell (provided of course a channel has not been made unavailable due to its simultaneous utilization at an adjacent cell site). Whereas, if 60 channels are used in a sector trunk cell site, these channels will be divided among the sectors, and only those channels associated with a particular sector will be available at any point within that sector. Of course, it shall be understood that the above discussion ignores the possibility of a communication device being positioned such that communication within multiple sectors or cells may be satisfactorily accomplished, in order to simplify the ideas being presented.

However, loading of sectors is often cyclic or dynamic in nature rather than constant. Accordingly, during certain times of day, such as business commuting times, a particular sector, such as a sector encompassing an urban highway, may service more users than during other times of day. Therefore, during particular times a particular area or areas of the cell may require increased capacity in order to service all users whereas at other times the cell's capacity might be better utilized when spread more homogeneously throughout the cell's coverage area.

Figure 2B:
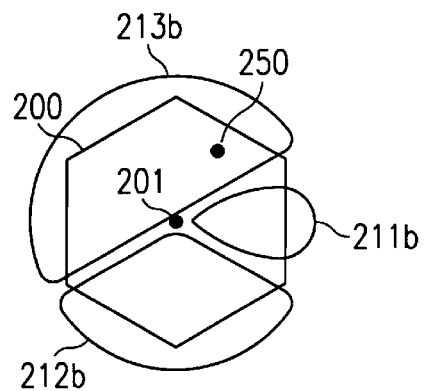

Directing attention to FIG. 2B, the sectored cell of FIG. 2A is shown having sectors adapted to distribute the available capacity as demanded by a particular loading pattern. Here radiation pattern 211b, associated with the a sector, is a 60° azimuthal beam and radiation pattern 213b, associated with the γ sector, is a 180° azimuthal beam while radiation pattern 212b, associated with the β sector, is a 120° azimuthal beam. Increased capacity is provided in the area of cell 200 served by radiation pattern 211b and a portion of radiation pattern 213b of FIG. 2B as compared to the same area as served by radiation pattern 211a of FIG. 2A. This is because of the increase in the number of channels available in this area due to the availability of channels of the γ sector in addition to those of the α sector. Likewise, increased capacity is experienced in the area serviced by radiation pattern 211b of FIG. 2B over that in the same area in the cell of FIG. 2A as subscriber units outside this relatively small area will not be able to establish or maintain communications on channels of the α sector in areas of cell 200 serviced by the γ sector of FIG. 2B which would be positioned to utilize capacity of the α sector of FIG. 2A.

In order to serve the changing loading conditions of a cell, and therefore to make more efficient use of cellular capacity, dynamic configuration of the sectors is desired. Accordingly, a first cell sector configuration, such as that of FIG. 2A, determined to provide a desired distribution of capacity for a particular loading pattern, may be adjusted while the cell is in operation to a second cell sector configuration, such as that of FIG. 2B, determined to provide a desired distribution of capacity for a subsequent loading pattern. Thus, the communication system may provide increased capacity to a particular area within the cell's radiation pattern by making more channels potentially available to that particular area, without actually increasing the total number of channels within the cell or the individual cell sectors.

Ideally, the shapable sectors will be composed of multiple narrow beams so as to provide a convenient means by which sectors may be synthesized in various sizes and/or shapes. Systems implementing such narrow beams may be comprised of a single multibeam antenna structure or may include a plurality of radiating structures, such as various phased array antenna panels, adapted to provide multiple narrow beams and disposed to illuminate the desired areas within the cell. The use of a phased array to produce antenna beams utilized according to the present invention is discussed in more detail below with reference to FIG. 4B. Of course, other adaptive antenna systems allowing the controlled radiation of signals within areas of the cell may be utilized according to the present invention, if desired.

Figure 3:
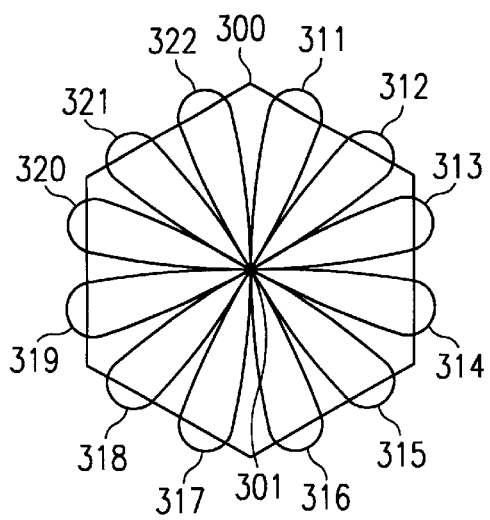
FIG. 3 illustrates a twelve narrow beam cellular radiation pattern.

Directing attention to FIG. 3, a multibeam cellular system, which includes cell 300 having antenna structure 301 radiating and/or receiving signals in twelve narrow beams as radiation patterns 311–322, is shown. It is possible to synthesize the radiation patterns of various cellular systems, such as those illustrated in FIGS. 1, 2A and 2B, by providing sector signals, i.e., signals carrying the channels associated with the sectors, to the appropriate beams of a multibeam cell, such as cell 300. For example, the omni directional radiation pattern of cell 100 may be synthesized by providing a sector signal, or all sector signals, to each antenna beam. Likewise, the three sectored radiation pattern of FIG. 2A may be synthesized by providing the α sector signal to beams 311–314, the β sector signal to beams 315–318, and the γ sector signal to beams 319–322. Alternatively, the three sectored radiation pattern of FIG. 2B may be synthesized by providing the α sector signal to beams 313 and 314, the β sector signal to beams 315–318, and the γ sector signal to beams 319–322 and beams 311 and 312.

However, it shall be appreciated that an abrupt change of sector configurations, such as between those shown in FIGS. 2A and 2B, may cause undesired servicing of subscriber units. For example, subscriber unit 250, operating within radiation pattern 211a of FIG. 2A, may experience unacceptable communication conditions or even be dropped from service by the BTS of cell 200 if the sector configuration were instantly changed to that of FIG. 2B where subscriber unit 250 operates within radiation pattern 213b. Accordingly, the present invention provides systems and methods to softly transition between such sector configurations in order to allow communication conditions to be maintained at desirable levels, such as by providing sufficient time for the affected subscriber units to detect the impending sector reconfiguration and respond accordingly.

Figure 4A:
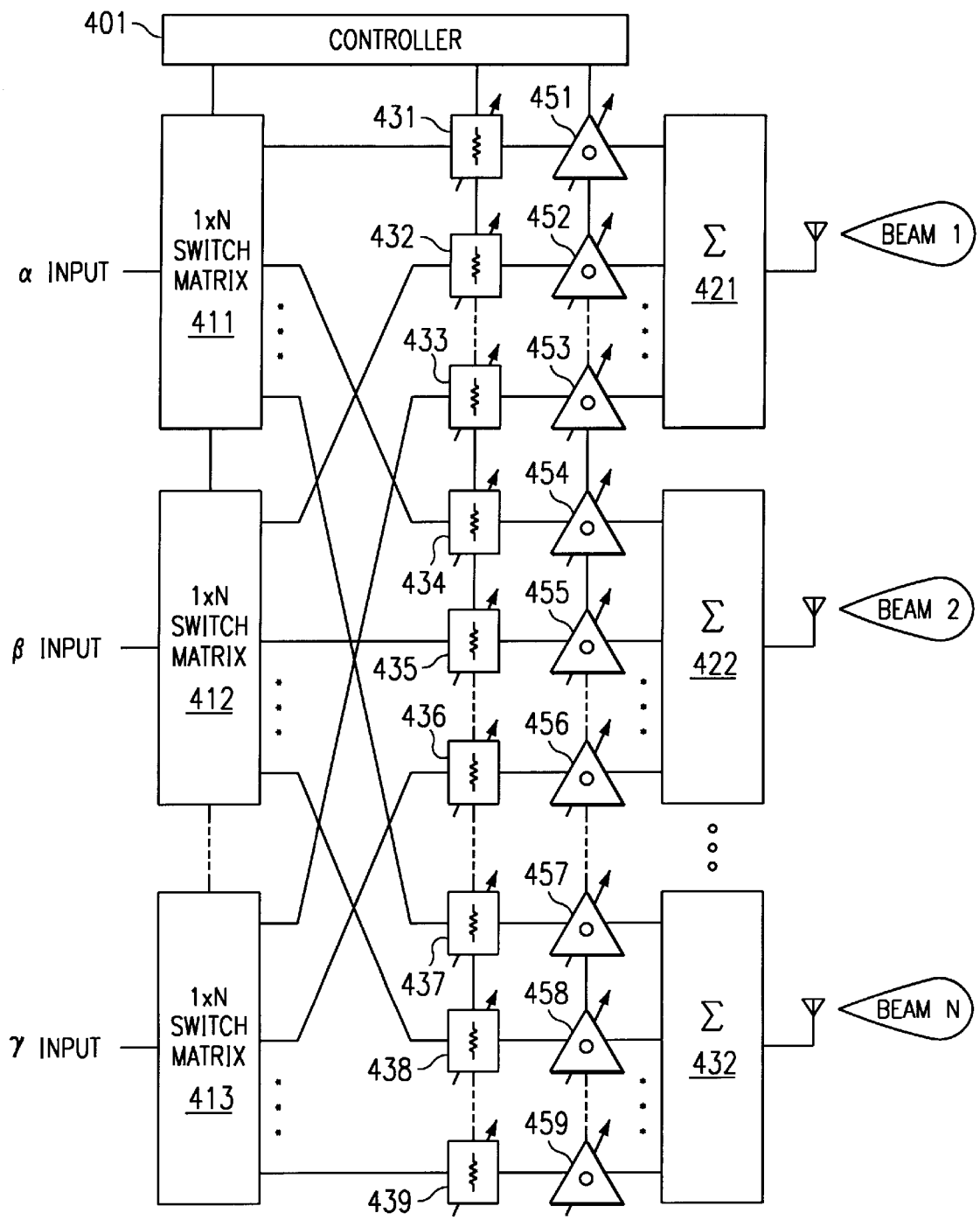
FIG. 4A illustrates a block diagram of circuitry to provide sector configuration transition according to a preferred embodiment of the present invention.

Directing attention to FIG. 4A, a preferred embodiment of circuitry suited for use in the transitioning of sectors according to the techniques of the present invention is shown. It shall be appreciated that the circuitry of FIG. 4A includes switch matrixes, attenuators (although the term "attenuator" is used, it shall be understood that signal gain by way of attenuation and/or amplification may be adjusted by the illustrated circuitry), and phase shifters operating under the control of a controller. This circuitry, in combination with the illustrated combiners, may be operated to provide any of the softened transition techniques of the present invention, or any combination thereof.

Illustrated in FIG. 4A are controller 401, switch matrixes 411–413, adjustable attenuators 431–439, adjustable phase shifters 451–459, and signal combiners 421–432. The adjustable attenuators utilized according to the present invention may be any form of signal gain adjusting device such as an adjustable resistive load for signal attenuation and adjustable linear power amplifier for signal gain. The adjustable phase shifters may utilize digital signal processing, in-phase and quadrature (I/Q) combining circuitry, switching predetermined lengths of transmission cable in and out of the signal path, or the like.

It shall be appreciated that the circuitry illustrated in FIG. 4A may be scaled for any number of inputs associated with the sector signals of the wireless communication service, although only the three inputs associated with an α, β, and γ sector are shown. For example, the number of sector inputs, may be doubled over those shown in order to provide for sector signal diversity where the BTS transceiver equipment so provides. Likewise, the number of antenna beams, N, may be any number, realizing of course that the number and size of these beams directly affects the characteristics of the sectors synthesized using the beams.

In order to synthesize the desired radiation patterns, the circuitry of FIG. 4A operates to switch a particular input associated with the desired radiation pattern, i.e., a sector output of a cell site transmitter, to a selected number of the antenna beams determined to produce the desired radiation pattern. For example, where the number of beams N of the preferred embodiment of FIG. 4A is twelve and the number of inputs of the first service is three, a three sectored cell may be synthesized as illustrated in FIG. 2A by properly switching switch matrixes 411–413. To provide the α sector signal in an area corresponding to sector 211 a of FIG. 2, switch matrix 411 is manipulated to provide the a sector signal to antenna beams 1–4, corresponding to beams 311–314 of FIG. 3. Similarly, the signals of the β sector signal are provided to antenna beams 5–8, corresponding to beams 315–318 of FIG. 3, and the signals of the γ sector signal are provided to antenna beams 9–12, corresponding to beams 319–322 of FIG. 3, through manipulation of switch matrixes 412 and 413 respectively.

Accordingly, it shall be appreciated that the sector width and azimuth of a synthesized sector is a function of the number of beams, and their beam width, associated with the sector signal. Similarly, the orientation of the sector is a function of the particular beams selected to synthesize the sector. Therefore, these attributes may be altered through selection of the antenna beams.

It shall be appreciated that the switching of signals to beams is not limited to non-overlapping sectors as described in the above example. By switching multiple input signals to a same beam, sectors may be defined which overlap, or partially overlap, if desired. Moreover, there is no requirement that all of the available beams be used in the sector mapping. For example, where coverage is not required in an area, the antenna beams associated therewith may not be switched to any sector input signal.

Moreover, it shall be appreciated that the size and orientation of sectors synthesized are limited only by the particular beams to which a signal is switched. Accordingly, the sectors may be controlled to provide a different azimuth grid point alignment as desired, such as to conform to local traffic, terrain features, blockages, or interference (in-band or out-of-band) conditions.

In order to provide automated manipulation of the switch matrixes of the present invention, a controller is coupled thereto as shown. Specifically, controller 401, adapted to manipulate switch matrixes 411–413, is provided to form desired sector configurations. Additionally, controller 401 is also adapted to manipulate switch matrixes 411–413, attenuators 431–439, as well as phase shifters 451–459 to transition between sector configurations according to the present invention as will be discussed herein below. It shall be appreciated that although a single controller is illustrated, these devices may in fact be controlled by any number of discrete controllers working alone or in concert to provide operation as described herein.

The controller of the present invention is a control system adapted to determine both a current sector configuration and a desired sector configuration and to control the system components to transition between these two sector configurations according to the transition techniques of the present invention. Accordingly, the controller may be embodied in a computer system operating under control of instructions for providing output signals suitable to manipulate the components shown in FIG. 4A. The instructions may operate in response to various inputs, such as monitored aspects of the cellular network, including subscriber unit positions, signal strengths, interference levels, load distributions, and the like, provided with respect to communications within the cell and/or other cells throughout the network.

The selection of a particular transition technique of the present invention may be made by the controller based on operating conditions measured, such as those described above, reference to a knowledge base, or the like. Likewise, the selection of a particular transition technique may be communicated to the controller by a centralized network control device, such as that shown and described in the above referenced patent application entitled "METHOD AND APPARATUS FOR IMPROVED CONTROL OVER CELLULAR SYSTEMS." Alternatively, the selection of a particular transition technique may be preselected, such as by a system technician or the like. Of course, although system components suitable for providing softened sector configuration transitions according to the various techniques of the present invention are shown in FIG. 4A, it shall be appreciated that where a transition technique of the present invention is not expected to be utilized by a particular installation some components shown in FIG. 4A, associated with that technique, may be omitted if desired.

Moreover, it shall be appreciated that the attenuators of the present invention may be operated to act as on/off switching devices with respect to signals being communicated to the antenna beams, i.e., attenuation of signals approaching infinity to effectively switch "off" a signal. Accordingly, signal routing may be dynamically controlled through the use of these attenuators, such as through operation of the aforementioned controller, rather than utilizing the switch matrixes shown. Therefore, in an alternative embodiment, the switch matrixes are replaced with the use of attenuators to provide the switchable connections between the sector inputs and the antenna beams. In this embodiment, splitters may be provided for each sector interface so as to provide a sufficient number of each signal for provision to a desired number of antenna beams. Attenuators are placed in the signal paths of each of these split signals and are then controlled to allow only desired signals to pass to a particular antenna beam.

Figure 4B:
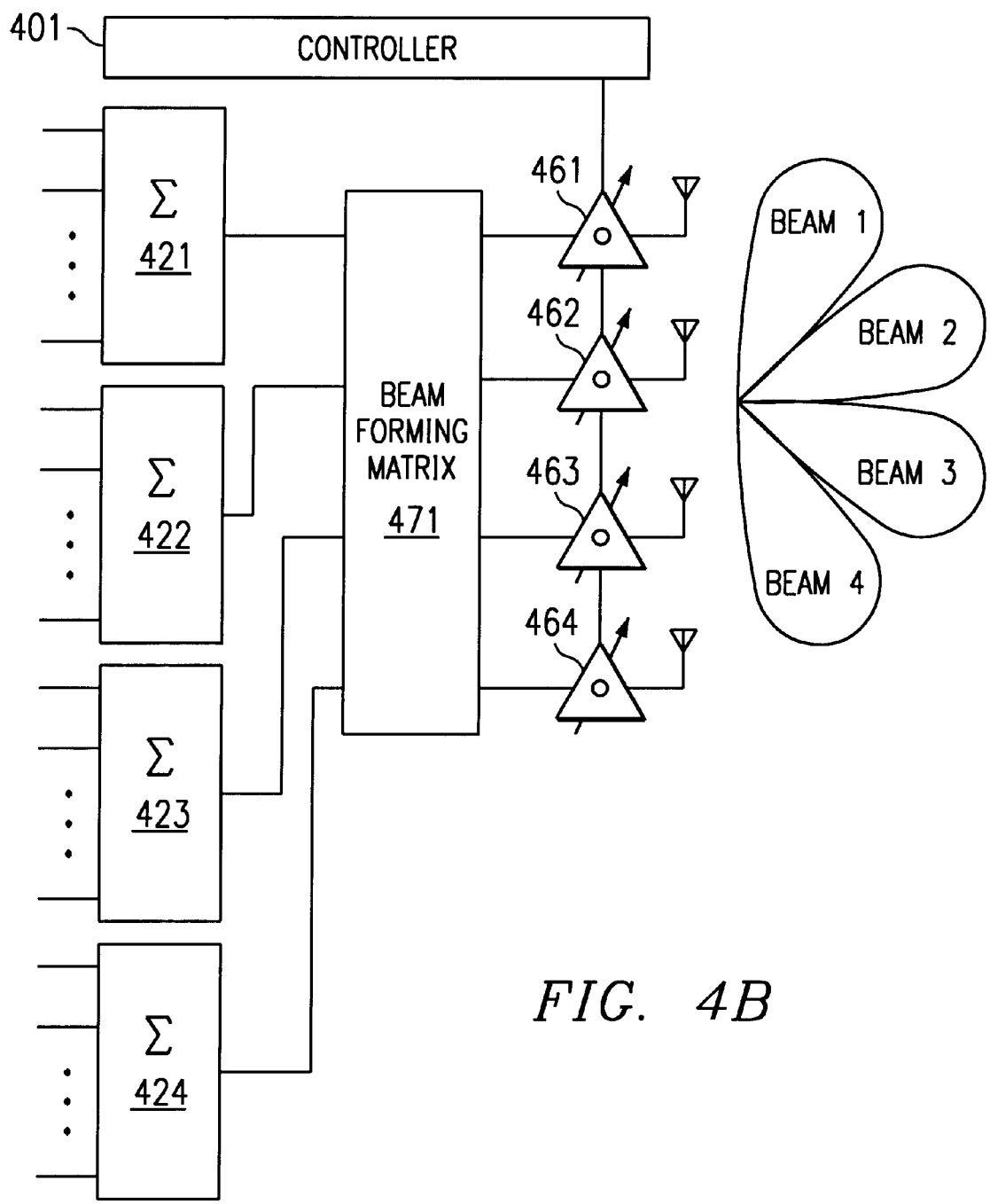
FIG. 4B illustrates a block diagram of an alternative embodiment of a portion of the circuitry of FIG. 4A.

Directing attention to FIG. 4B, a portion of the circuitry of the system of FIG. 4A is shown adapted to operate with a phased array of antennas to produce the antenna beams utilized according to the present invention. It shall be appreciated that the beam forming matrix of FIG. 4B may be scaled, or additional beam forming matrixes may be utilized, in order to couple sector signals to the desired number of antenna beams. For example, in the preferred embodiment utilizing twelve narrow beams, three beam forming matrixes configured as shown in FIG. 4B may be used.

Beam forming matrix 471, which may, for example, be a Butler matrix well known in the art, is disposed between the signal combiners, used to provide the various sector signals to the antenna beams, and the phased array antennas used to produce the antenna beams. Accordingly, any sector signal provided at a particular input of the beam forming matrix will be provided to the individual antennas of the phased array in a predefined phase progression in order to beneficially and destructively combine to form the desired radiation pattern. For example, a sector signal provided through signal combiner 421 will be input to beam forming matrix 471 through a first input coupled to the outputs of beam forming matrix 471 introducing a phase progression for forming the radiation pattern of beam 1. Likewise, a sector signal provided through signal combiner 422 will be input to beam forming matrix 471 through a second input coupled to the outputs of beam forming matrix 471 introducing a phase progression for forming the radiation pattern of beam 2.

To provide adjustment of the phased progression utilized to form an antenna beam, useful in the phase adjustment technique of the present invention, adjustable phase shifters 461–464 may be disposed in the signal path of the phased array. Accordingly, the phase progression used for forming the radiation pattern of a particular antenna beam as provided by the beam forming matrix may be adjusted to alter the shape and/or size of the antenna beam ultimately formed. Operating under control of controller 401, as described above with respect to the adjustable components shown in FIG. 4A, phase shifters 461–464 may be utilized to provide the phase adjustment sector configuration transition technique of the present invention described below. Of course, rather than providing phase adjustment at the phased array, the phase shifters disposed in the signal path prior to the beam forming matrix, shown in FIG. 4A, may be utilized to provide a particular sector signal to multiple adjacent beams having a phase relationship to destructively and beneficially combine in order to provide a desired radiation pattern. Moreover, it shall be appreciated that signal attenuators, in combination with the phase shifters, may be utilized in controlling beneficial and destructive combining of radiation to define a desired radiation pattern. Furthermore, such attenuators (not shown) may be disposed in the signal path between the beam forming matrix and phased array.

It shall be appreciated that, although phase shifters are shown discrete from the beam forming matrix of FIG. 4B, such phase shifters may in fact be a part of the beam forming matrix. For example, components of the beam forming matrix utilized in providing the phase progression may be adjustable to allow selective control by controller 401.

Having described circuitry adapted for use according to the present invention, the sector configuration transition techniques of the preferred embodiment of the present invention will be described. As described above, abrupt changes in the sector configuration of a cell may cause disruptions in service to subscriber units in the communication network. Therefore, according to the present invention, sector transitions are softened, i.e., faded-in, such that subscriber units may detect the changing sector configuration and react accordingly. Thus, the subscriber units are not adversely affected, such as by dropped calls, poor voice quality, failed call originations, and the like, by the changes in sector configurations. The softened sector transitions of the present invention are preferably accomplished according to the present invention by techniques including dithering, blending, tapering, and adjusting of signals associated with narrow antenna beams used to synthesize the desired sectors.

In a preferred embodiment of the present invention time dithering is used to soften the transition between sector configurations. When time dithering is utilized according to the present invention with narrow antenna beams used to synthesize sectors, sector signals are broadcast from the narrow antenna beams in rapid time dithering to "ping-pong" back and forth between the old sector configuration and the new sector configuration to allow subscriber units sufficient time to observe and react to the new sector configuration.

Figure 5A:
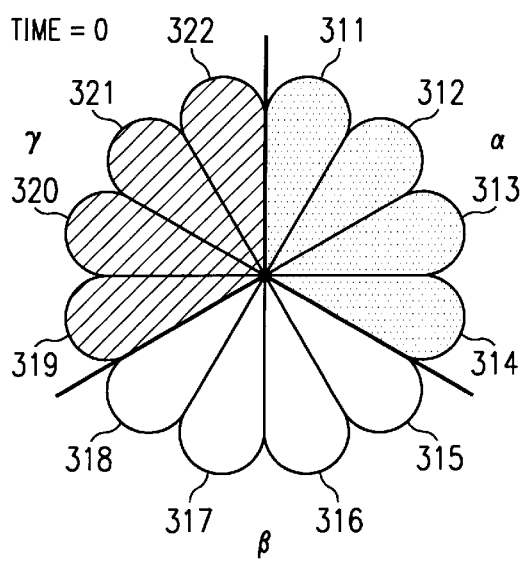
FIGS. 5A–5E illustrate a preferred embodiment of time dithering transition between sector configurations.
Figure 5B:
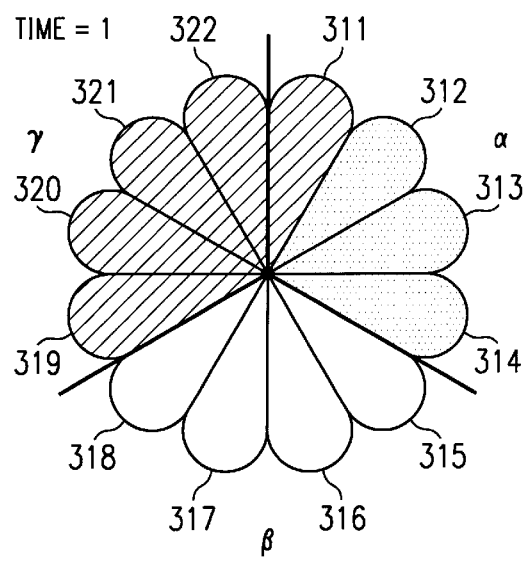
Figure 5C:
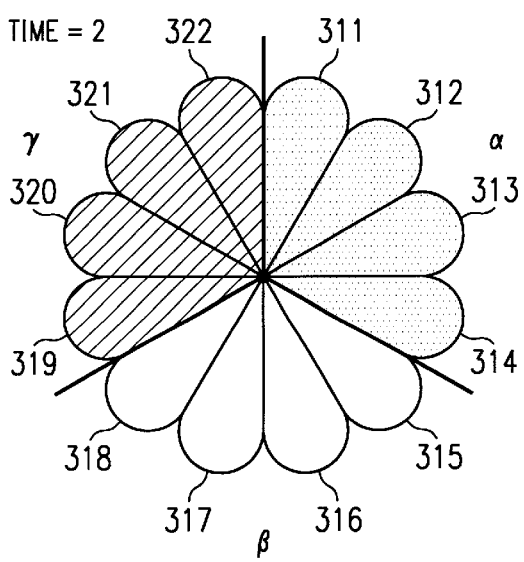
Figure 5D:
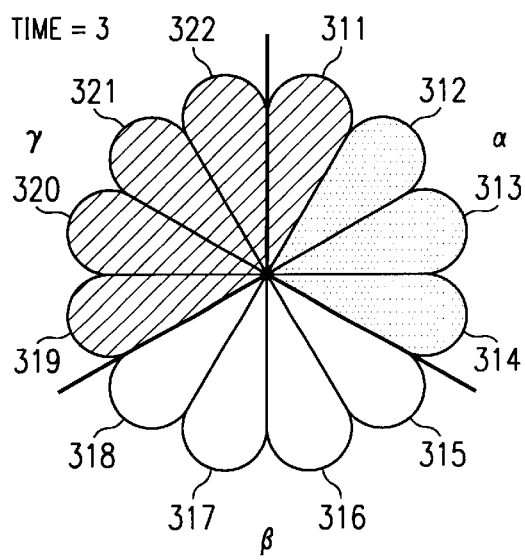
Figure 5E:
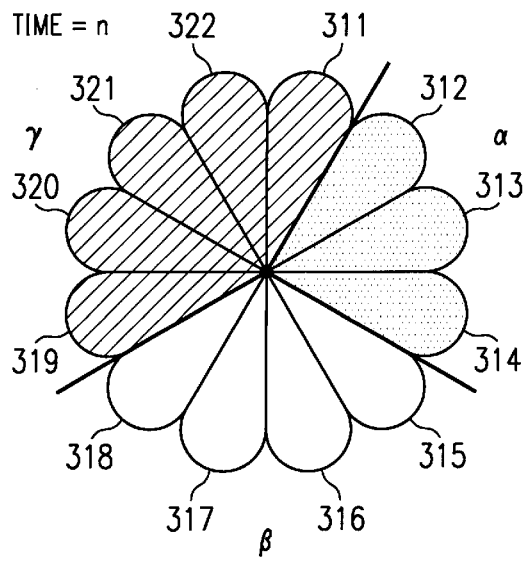

As shown in FIGS. 5A–5E, time dithering according to this preferred embodiment involves alternately transmitting one sector signal, then another sector signal, on a single antenna beam. FIG. 5A, illustrated at time=0, shows an old sector configuration substantially as shown in FIG. 2A synthesized utilizing multiple narrow antenna beams. FIG. 5E, illustrated at time=n, shows a new sector configuration similar to that shown in FIG. 2B also synthesized utilizing multiple narrow antenna beams through the sector signal routing as described above.

In order to provide the softened sector configuration transition according to the present invention the transition from the sector configuration of FIG. 5A to that of FIG. 5E is not immediate. FIGS. 5B–5D illustrate time epochs of the time dithered transition from the old sector configuration of FIG. 5A and the new sector configuration of FIG. 5E. According to this embodiment of the present invention radiation pattern 311, the narrow antenna beam associated with the α sector in the old sector configuration of FIG. 5A and associated with the γ sector in the new sector configuration of FIG. 5E, is alternately provided with the α and γ sector signals. Accordingly, in FIG. 5B, time=1, radiation pattern 311 radiates the γ sector signal, in FIG. 5C, time=2, radiation pattern 311 radiates the α sector signal, and in FIG. 5D, time =3, radiation pattern 311 again radiates the γ sector signal.

It shall be appreciated that the time dithering of this embodiment of the present invention may be accomplished through proper switching of the switch matrixes of FIG. 4A. Likewise, the time dithering of this embodiment of the present invention may be accomplished through adjusting the attenuators of FIG. 4A to pass a desired sector signal to a particular antenna beam while increasing impedance to approach infinity to prevent passing another sector signal to that particular antenna beam.

Although the dwell times may be held constant throughout the transition process to further soften the transition, during the transition period the dwell times on the sectors may be gradually increased for the new sector and gradually reduced for the old sector. For example, the first epoch associated with the new sector configuration, i.e. time=1 of FIG. 5B, is shorter in time than the second epoch associated with the new sector configuration, i.e., time=3 of FIG. 5D. Likewise, the first epoch associated with the old sector configuration, i.e., time=2 of FIG. 5C, is longer in time than a subsequent epoch associated with the old sector configuration.

It shall be appreciated that, although only three epochs are illustrated in the transition between the sector configurations, any number of such epochs may be utilized according to the present invention. Generally, the more epochs utilized in the sector configuration transition, the softer the transition will be. However, the number of epochs utilized in the transition will necessarily affect the length of time required to accomplish the sector configuration transition, requiring control resources etcetera throughout, and therefore, should be selected so as to provide both an acceptably soft transition as well as one which may be accomplished in a time span suitable for use in the particular communication network.

Where the transition in sector configurations includes changing sector signals to more than one antenna beam, the time dithering of the present invention may operate in a number of ways. For example, the time dithering epochs as illustrated in FIGS. 5A–5E may be repeated for each antenna beam changed by the transition, i.e., the first antenna beam change is dithered as illustrated then the next antenna beam change is dithered etcetera. Alternatively, the time dithering epochs as illustrated in FIGS. 5A–5E may include all of the antenna beams changed by the transition, i.e., where two antenna beams are changed the first epoch includes both radiating the new sector signal and the second epoch includes both radiating the old sector signal. In another alternative embodiment, the sector transition epochs may cascade the dithering of the antenna beams changed, i.e., where two antenna beams are changed the first epoch includes radiating the new sector signal from a first antenna beam, preferably contiguous to the antenna beams already radiating the new sector signal, the second epoch includes the first antenna beam radiating the old sector signal, and the third epoch includes the first and a second antenna beam radiating the new sector signal.

It shall be appreciated that time dithering according to the present invention provides a transition to a new sector configuration where the subscriber units may detect the impending change in sector configuration and react accordingly. For example, a subscriber unit operating within radiation pattern 311 utilizing a channel associated with the a sector will temporarily lose this α sector channel, or at least experience degraded communications due to maintaining communication through a less than ideal antenna beam, during the first (time=1) and third (time=3) epochs. Of course, where the epochs are selected so as to be of sufficiently brief duration so as not to trigger a dropped call or otherwise degrade communications below a preselected threshold, the subscriber unit will be able to detect the loss of signal before the subscriber using the unit can detect degradation in the communication.

An alternative embodiment of the present invention utilizes amplitude tapering to soften the transition between sector configurations. When amplitude tapering is utilized according to the present invention, sector signal amplitude levels for an antenna beam of the old sector configuration near the transition area between the new and old sectors is gradually increased, while sector signal amplitude levels for an antenna beam of the new sector configuration near the transition are between the new and old sectors is gradually decreased. The use of gradual amplitude tapering allows subscriber units sufficient time to observe and react to the new configuration.

Figure 6A:
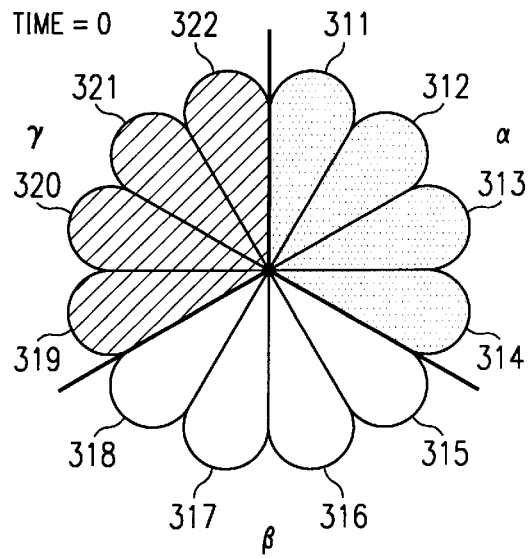
FIGS. 6A–6G illustrate a preferred embodiment of amplitude tapering transition between sector configurations.
Figure 6B:
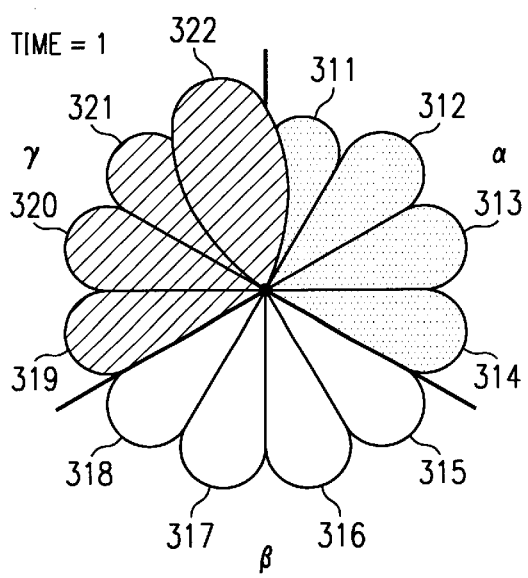
Figure 6C:
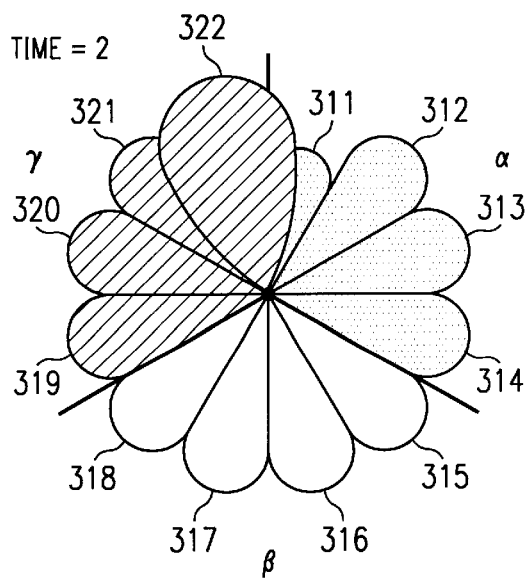
Figure 6D:
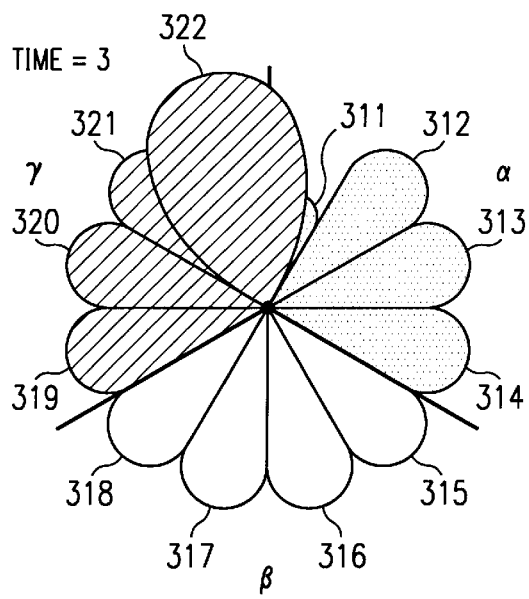
Figure 6E:
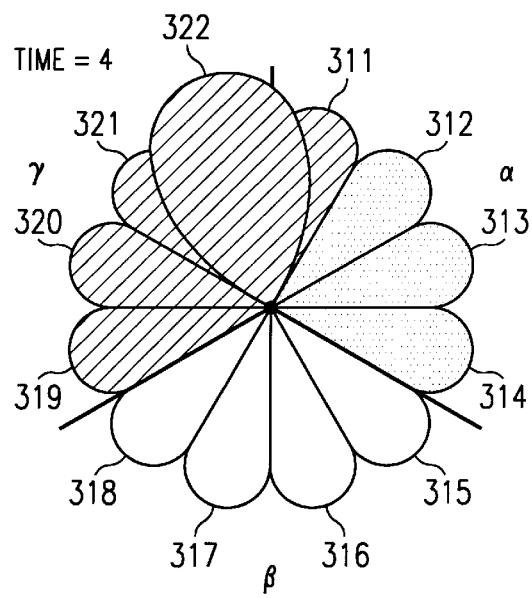
Figure 6F:
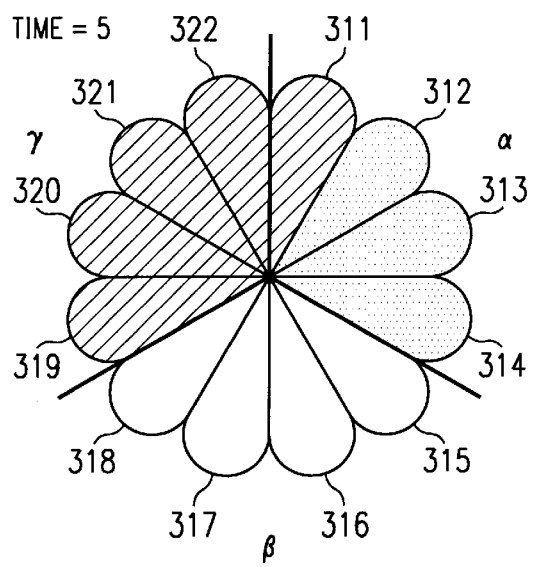
Figure 6G:
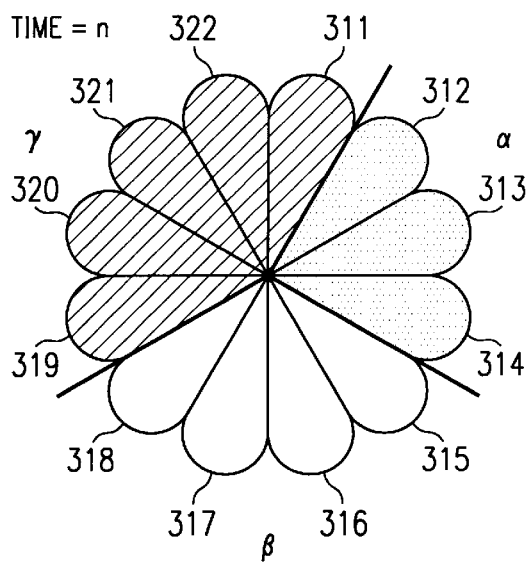

As shown in FIGS. 6A–6G, amplitude tapering according to this preferred embodiment involves increasing the amplitude of a first sector signal of an antenna beam to radiate the first sector signal in an area associated with the new sector configuration while decreasing the amplitude of a second sector signal of another antenna beam to discontinue radiation of the second sector signal in the area associated with the new sector configuration. FIG. 6A, illustrated at time=0, shows an old sector configuration substantially as shown in FIG. 2A synthesized utilizing multiple narrow antenna beams. FIG. 6G, illustrated at time=n, shows a new sector configuration similar to that shown in FIG. 2B also synthesized utilizing multiple narrow antenna beams through the sector signal routing as described above.

In order to provide the softened sector configuration transition according to the present invention the transition from the sector configuration of FIG. 6A to that of FIG. 6G is not immediate. FIGS. 6B–6F illustrate time epochs of the amplitude tapering transition from the old sector configuration of FIG. 6A and the new sector configuration of FIG. 6G. According to this embodiment of the present invention the α sector signal associated with radiation pattern 311, the narrow antenna beam associated with the α sector in the old sector configuration of FIG. 6A and associated with the γ sector in the new sector configuration of FIG. 6G, is gradually decreased to discontinue its presence in the area of the sector configuration transition. Likewise, the 65 sector signal associated with radiation pattern 322, the narrow antenna beam associated with the γ sector which is most near the sector transition area of the new sector configuration, is gradually increased to radiate the γ sector signal in the area of the sector configuration transition.

Accordingly, in FIG. 6B, time=1, radiation pattern 311 radiates the γ sector signal slightly attenuated while radiation pattern 322 radiates the γ sector signal slightly increased in gain as compared to the previous epoch. This gradual amplitude tapering is continued in subsequent epochs as illustrated in FIG. 6C, time=2, and FIG. 6D, time=3. It shall be appreciated that ultimately the sector signal of the antenna beam in the transition area associated with the old sector configuration is attenuated to the point it is no longer of influence to the subscriber units, as illustrated in FIG. 6D.

Accordingly, in subsequent epochs, that antenna beam is provided the sector signal associated with the new sector configuration, as is radiation pattern 311 of FIG. 6E. Having provided the sector signal associated with the new sector configuration directly within the radiation pattern of the antenna beam in the transition area, the gain of the sector signal of the most near the sector transition area of the new sector configuration may again be returned to normal as illustrated in FIG. 6F. It shall be appreciated that the amplitude tapering of this embodiment of the present invention may be accomplished through proper control of the attenuators of FIG. 4A.

It shall be appreciated that, although only five epochs are illustrated in the transition between the sector configurations, any number of such epochs may be utilized according to the present invention. Generally, the more epochs utilized in the sector configuration transition, the softer the transition will be. However, the number of epochs utilized in the transition will necessarily affect the length of time required to accomplish the sector configuration transition, requiring control resources etcetera throughout, and therefore, should be selected so as to provide both an acceptably soft transition as well as one which may be accomplished in a time span suitable for use in the particular communication network. Additionally, it shall be appreciated that the amplitude tapering of the present invention may not actually include discrete epochs of gain adjustment, but rather a continuous adjustment of the sector signals over time in order to provide the amplitude tapering described.

Where the transition in sector configurations includes changing sector signals to more than one antenna beam, the amplitude tapering of the present invention may operate in a number of ways. For example, the amplitude tapering epochs as illustrated in FIGS. 6A–6G may be repeated for each antenna beam changed by the transition, i.e., the first antenna beam change is amplitude tapered as illustrated then the next antenna beam change is amplitude tapered etcetera. Alternatively, the amplitude tapering epochs as illustrated in FIGS. 6A–6G may include all of the antenna beams changed by the transition, i.e., where two antenna beams are changed the old sector signal for both of these antenna beams are attenuated slightly in the first epoch while the old sector signal for both of these antenna beams are attenuated somewhat more in the second epoch. In another alternative embodiment, the sector transition epochs may cascade the amplitude tapering of the antenna beams changed, i.e., where two antenna beams are changed the first epoch includes attenuation of the old sector signal of a first antenna beam, preferably not contiguous to the antenna beams already radiating the new sector signal, the second epoch includes increased attenuation of the old sector signal of the first antenna beam and initial attenuation of the old sector signal of a second antenna beam.

It shall be appreciated that amplitude tapering according to the present invention provides a transition to a new sector configuration where the subscriber units may detect the impending change in sector configuration and react accordingly. For example, a subscriber unit operating within radiation pattern 311 utilizing a channel associated with the α sector will gradually lose this α sector channel while being provided with an ever improving γ sector signal throughout the epochs of the transition. Of course, where the attenuation of the sector signal in the epochs are selected so as to be of sufficiently small change so as not to trigger a dropped call or otherwise degrade communications below a preselected threshold, the subscriber unit will be able to detect the loss of signal before the subscriber using the unit can detect degradation in the communication.

Another alternative embodiment of the present invention utilizes sector blending to soften the transition between sector configurations. When sector blending is utilized according to the present invention, multiple sector signals are simultaneously transmitted on a single antenna beam to allow subscriber units sufficient time to observe and react to the new sector configuration. Accordingly, sector blending is, in effect, "simulcasting" multiple sectors on particular antenna beams during the transition period. Of course, the simulcasting of the multiple sector signals may utilize varying amplitudes of each signal, if desired. For example, the amplitude of a signal associated with an old sector configuration may be decreased while the simulcast signal of a sector associated with a new configuration has its amplitude increased. Moreover, the decreasing/increasing of these signal's amplitude may be independent of each other, i.e., the signal of the new configuration may be slowly increased to full power and then the signal of the old configuration slowly decreased.

Figure 7A:
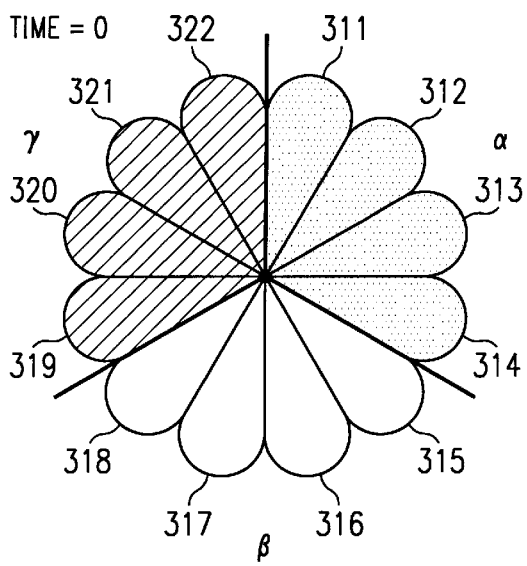
FIGS. 7A–7C illustrate a preferred embodiment of sector blending transition between sector configurations.
Figure 7B:
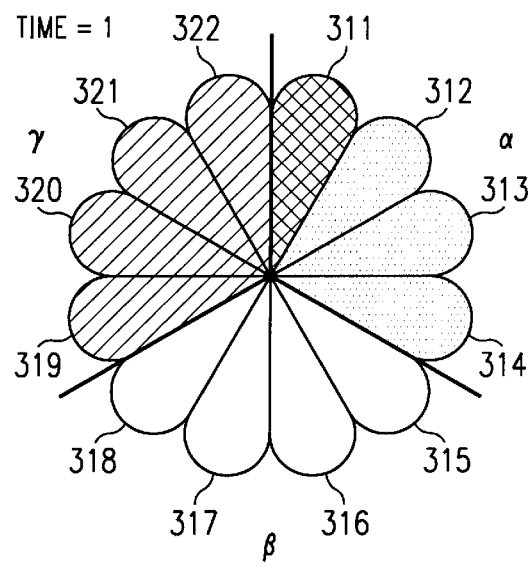
Figure 7C:
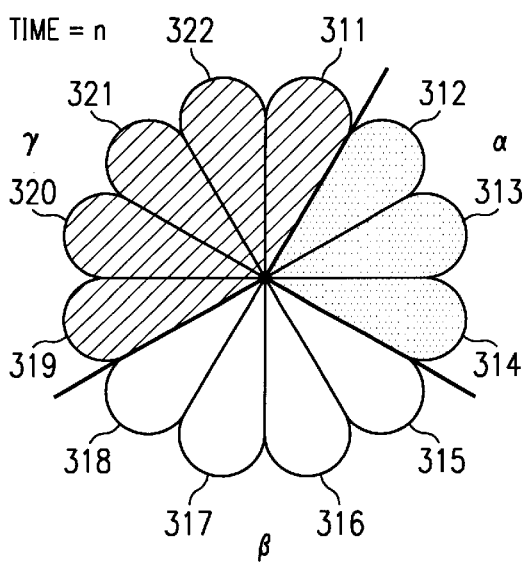

As shown in FIGS. 7A–7C, sector blending according to this preferred embodiment involves simultaneously radiating multiple sector signals within an antenna beam. FIG. 7A, illustrated at time=0, shows an old sector configuration substantially as shown in FIG. 2A synthesized utilizing multiple narrow antenna beams. FIG. 7C, illustrated at time=n, shows a new sector configuration similar to that shown in FIG. 2B also synthesized utilizing multiple narrow antenna beams, through the sector signal routing as described above.

In order to provide the softened sector configuration transition according to the present invention the transition from the sector configuration of FIG. 7A to that of FIG. 7C is not immediate. FIG. 7B illustrates a time epoch of the sector blending transition from the old sector configuration of FIG. 7A and the new sector configuration of FIG. 7C. According to this embodiment of the present invention radiation pattern 311, the narrow antenna beam associated with the α sector in the old sector configuration of FIG. 7A and associated with the γ sector in the new sector configuration of FIG. 7C, is provided with the α and γ sector signals simultaneously during the transition. Accordingly, in FIG. 7C, time=1, radiation pattern 311 radiates the a sector signal as well as the γ sector signal.

It shall be appreciated that the sector blending of this embodiment of the present invention may be accomplished through proper switching of the switch matrixes of FIG. 4A. Likewise, the sector blending of this embodiment of the present invention may be accomplished through adjusting the attenuators of FIG. 4A to pass a desired sector signals to a particular antenna beam.

Where the transition in sector configurations includes changing sector signals to more than one antenna beam, the sector blending of the present invention may operate in a number of ways. For example, the sector blending epochs as illustrated in FIGS. 7A–7C may be repeated for each antenna beam changed by the transition, i.e., the first antenna beam change is blended as illustrated then the next antenna beam change is blended etcetera. Alternatively, the sector blending epochs as illustrated in FIGS. 7A–7C may include all of the antenna beams changed by the transition, i.e., where two antenna beams are changed the first epoch includes both antenna beams radiating the old and new sector signals. In another alternative embodiment, the sector blending epochs may cascade the blending of sector signals in the antenna beams changed, i.e., where two antenna beams are changed the first epoch includes blending the sector signals in a first antenna beam, preferably contiguous to the antenna beams already radiating the new sector signal, the second epoch includes blending the sector signals in the first and second antenna beams, and the third epoch includes the first antenna beam radiating the new sector signal unblended while the sector signals are still blended in the second antenna beam.

It shall be appreciated that sector blending according to the present invention provides a transition to a new sector configuration where the subscriber units may detect the impending change in sector configuration and react accordingly. For example, a subscriber unit operating within radiation pattern 311 utilizing a channel associated with the α sector will detect the availability of the γ sector signal while still able to communicate on the α sector channel, although this α sector channel may experience degraded communications due to increased interference from the γ sector signal. Accordingly, the subscriber unit will be able to detect the availability of the new sector's signal and request a handoff before the subscriber using the unit can detect degradation in the communication.

Another alternative embodiment of the present invention utilizes phase adjustment to soften the transition between sector configurations. When phase adjustment is utilized according to the present invention, varying the shape of the antenna radiation patterns to have desired nulls and/or peaks is used to aid the sector transitioning. Through the use of phase adjustments between signals of the various antenna beams of a sector, i.e., vector control, it is possible to steer a null for a particular sector in the direction of the transition area in order to facilitate handoffs required to complete the sector transition without dropped calls.

Figure 8A:
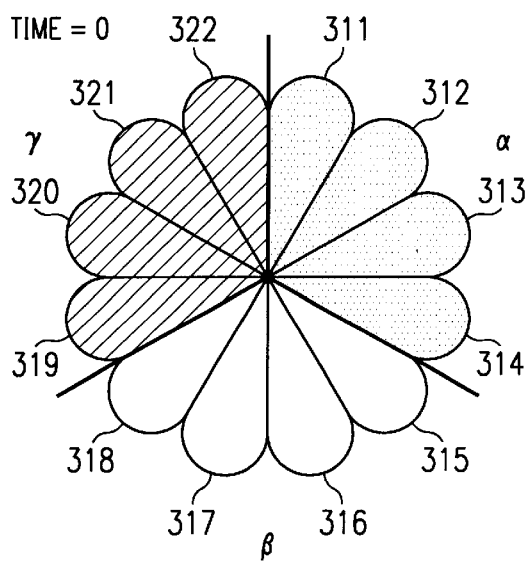
FIGS. 8A–8E illustrate a preferred embodiment of phase adjustment transition between sector configurations.
Figure 8B:
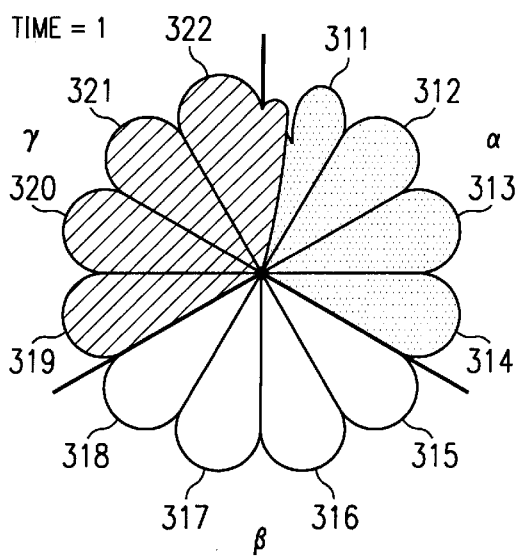
Figure 8C:
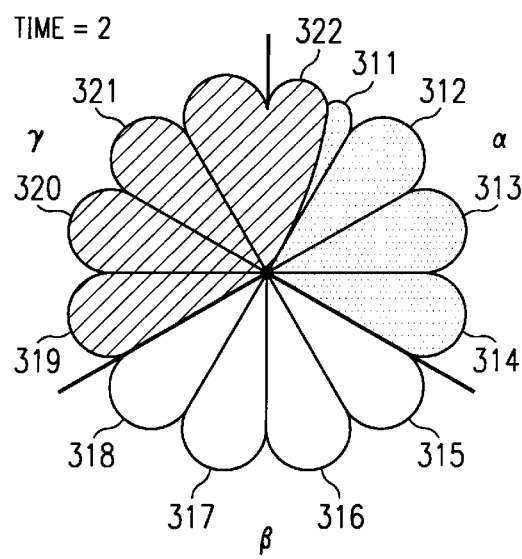
Figure 8D:
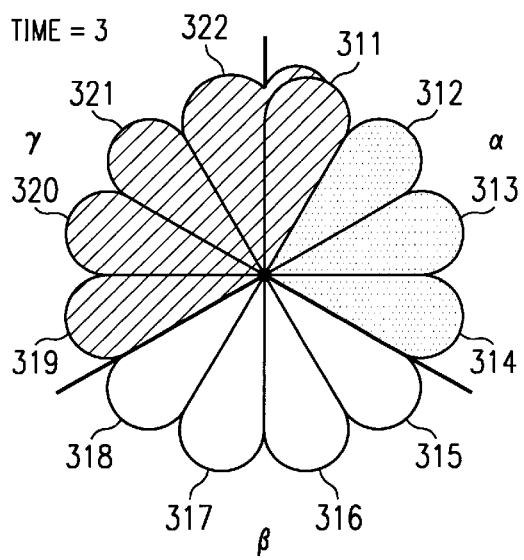
Figure 8E:
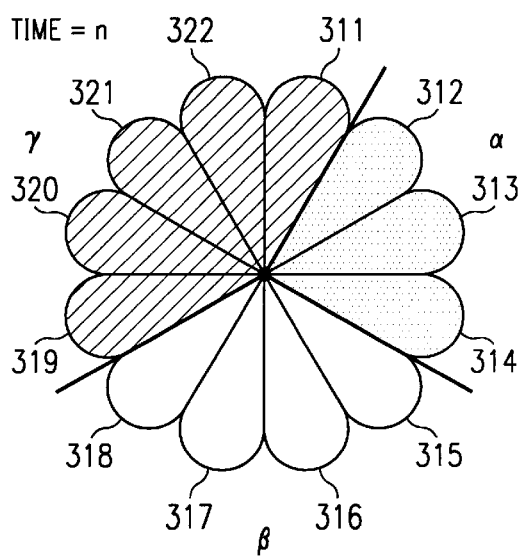

As shown in FIGS. 8A–8E, phase adjustment according to this preferred embodiment involves adjusting phase, and possibly amplitude, relationships to cause antenna beams to be reshaped and/or resized to increasingly radiate a first sector signal in an area associated with the new sector configuration, and decreasingly radiate a second sector signal in an area associated with the old sector configuration. FIG. 8A, illustrated at time=0, shows an old sector configuration substantially as shown in FIG. 2A synthesized utilizing multiple narrow antenna beams. FIG. 8E, illustrated at time=n, shows a new sector configuration similar to that shown in FIG. 2B also synthesized utilizing multiple narrow antenna beams through the sector signal routing as described above.

In order to provide the softened sector configuration transition according to the present invention the transition from the sector configuration of FIG. 8A to that of FIG. 8E is not immediate. FIGS. 8B–8D illustrate time epochs of the phase adjusted transition from the old sector configuration of FIG. 8A and the new sector configuration of FIG. 8E. According to this embodiment of the present invention the shape of radiation pattern 322, the narrow antenna beam associated with the γ sector in the old sector configuration of FIG. 8A which is closest to the transition area, is altered to increasingly provide the old α sector with the γ sector signal. Likewise, the shape of radiation pattern 311, the narrow antenna beam associated with the α sector in the old sector configuration of FIG. 8A and the new sector configuration of FIG. 8E, is altered to decreasingly provide the old α sector with the α sector signal. Accordingly, in FIG. 8B, time=1, radiation pattern 322 is shaped to radiate the γ sector signal slightly within an area previously associated with radiation pattern 311, while radiation pattern 311 is shaped to radiate the α sector signal in a slightly smaller area than previously associated with radiation pattern 311. Adjusting of the shape of the radiation patterns continues until the transition area is substantially encompassed by the enlarged antenna beam, as shown in FIG. 8C. Thereafter, radiation pattern 311 is provided with the new sector signal, as shown in FIG. 8D, and the radiation patterns return to their normal size as shown in FIG. 8E. It shall be appreciated that, although decreasing the size of the antenna beam in the transition area between the old and new sector configurations is shown according to the preferred embodiment, this aspect may be omitted in favor of only enlarging the antenna beam nearest this transition area if desired.

It shall be appreciated that the phase adjustment of this embodiment of the present invention may be accomplished through proper control of the phase shifters and switch matrixes of FIG. 4A. Specifically, in order to provide an enlarged radiation pattern 322, the sector signal radiated within radiation pattern 322 (the γ sector signal in the example used herein) may also be provided to other antenna beams, such as that associated with radiation pattern 311, having a particular phase, and possibly amplitude, relationship to that of radiation pattern 322 in order to beneficially and destructively combine. Provision of the sector signal radiated within radiation pattern 322 to radiation pattern 311 (the γ sector signal) is preferably in combination with provision of an old sector signal (the α sector signal in the example used herein) to radiation pattern 311 so as to provide this old sector signal within portions of the transition area during the transition. Of course, the old sector signal (the α sector signal) may likewise be provided to other antenna beams in order to beneficially and destructively combine to reduce its area of influence in the transition area.

Likewise, the phase adjustment of this embodiment of the present invention may be accomplished through adjusting the phase shifters of FIG. 4B to adjust a phase progression of a phased array. However, it shall be appreciated that adjusting the phase shifters of FIG. 4B will result in all antenna beams formed by the phased array being altered.

It shall be appreciated that, although only three epochs are illustrated in the transition between the sector configurations, any number of such epochs may be utilized according to the present invention. Generally, the more epochs utilized in the sector configuration transition, the softer the transition will be. However, the number of epochs utilized in the transition will necessarily affect the length of time required to accomplish the sector configuration transition, requiring control resources etcetera throughout, and therefore, should be selected so as to provide both an acceptably soft transition as well as one which may be accomplished in a time span suitable for use in the particular communication network. Additionally, it shall be appreciated that the phase adjustment of the present invention may not actually include discrete epochs of radiation pattern shape adjustment, but rather a continuous adjustment of the phase relationships over time in order to provide the phase adjustment described.

Where the transition in sector configurations includes changing sector signals to more than one antenna beam, the phase adjustment of the present invention may operate in a number of ways. For example, the phase adjustment epochs as illustrated in FIGS. 8A–8E may be repeated for each antenna beam changed by the transition, i.e., the first antenna beam change is shaped as illustrated then the next antenna beam change is shaped etcetera. Alternatively, the phase adjustment epochs as illustrated in FIGS. 8A–8E may be done simultaneously for all the antenna beam changed by the transition, i.e., the first antenna beam change is shaped as illustrated and at the same time another antenna beam change is shaped. In another alternative, the sector transition epochs may cascade the reshaping of the antenna beams changed, i.e., where two antenna beams are changed the first epoch includes enlarging a first antenna beam associated with the sector signal to be radiated in the transition area and decreasing a first antenna beam associated with the sector signal to be no longer radiated in the transition area, preferably contiguous to the antenna beams already radiating the new sector signal. Thereafter, as the first antenna beam associated with the sector signal to be radiated in the transition area is enlarged, a second antenna beam associated with the sector signal to be no longer radiated in the transition area is decreased. As the cascade continues the first antenna beam associated with the sector signal to be radiated in the transition area may be returned to a normal size in favor of another antenna beam which has begun to radiate the new sector signal being enlarged.

It shall be appreciated that phase adjustment according to the present invention provides a transition to a new sector configuration where the subscriber units may detect the impending change in sector configuration and react accordingly. For example, a subscriber unit operating within radiation pattern 311 utilizing a channel associated with the α sector will gradually loose this α sector channel while being provided with an ever improving γ sector signal throughout the epochs of the transition. Of course, where the reshaping of the antenna beams in the epochs are selected so as to be of sufficiently small change so as not to trigger a dropped call or otherwise degrade communications below a preselected threshold, the subscriber unit will be able to detect the loss of signal before the subscriber using the unit can detect degradation in the communication.

It shall be appreciated, although described in the alternative, that any of the sector transition techniques of the present invention may be used in combination to provide soft sector transitioning. For example combinations of time dithering and amplitude tapering may be used to gradually adjust amplitude levels of the sectors in combination with "ping-ponging" a sector's signal back and forth between the old and new sector configuration. The time dithering of this combined technique may include switching sectors back and forth and/or switching gain levels back and forth.

Likewise, a combination of sector blending and amplitude tapering may be utilized according to the present invention. For example, amplitude tapering may be implemented to slowly phase in the blended sector signals and, thereafter, slowly phase out the blended sector signals to leave the desired new sector configuration.

Similarly, a combination of amplitude tapering and phase adjustment (vector control) may be utilized in synthesizing varying antenna patterns to aid the sector transitioning. For example, in order to synthesize an antenna pattern having a desired null or peak, the amplitude of sector signals as provided to various antenna beams may be adjusted in combination with adjusting their relative phases in order that they may beneficially or destructively combine to synthesize the desired radiation pattern.

The softened transition between sectors according to the present invention operates to cause the subscriber unit to detect deteriorating communication with the old sector and improved communication with the new sector. Accordingly, the present invention may be implemented within an existing communication network, such as cellular telephone communication networks, to provide dynamically configurable sectors without detrimentally affecting communications as sector configurations are changed and without the need for any modifications or special equipment in the subscriber units. This is accomplished because the present invention operates to emulate handoff conditions already provided for in the communication network, such as those present as a subscriber unit physically moves between the influence of two sectors.

Although discussed with reference to the forward, or transmit, signal path, it shall be appreciated that the present invention is also operable in the reverse, or receive, signal path. Accordingly, signal splitters in the receive signal path, corresponding to the placement of the signal combiners in the forward signal path, may be utilized to provide the antenna beam signals to phase shifters, attenuators, and switch matrixes to softly transition sectors in the receive path.

It shall be appreciated that, although the specific examples herein have been discussed with respect to a twelve beam multibeam antenna system, the present invention may utilize any number of antenna beams deemed advantageous. Moreover, antenna beams utilized to synthesize sectors according to the present invention are not limited to the substantially uniform beams illustrated, but may include various beams sizes and/or shapes. Likewise, any adaptive system providing radiation patterns controllable as described herein may be utilized according to the present invention.

Although the present invention and its advantages have been described in detail, it should be understood that various changes, substitutions and alterations can be made herein without departing from the spirit and scope of the invention as defined by the appended claims.

What is claimed is:

1. A method for transition from a first radiation pattern configuration to a second radiation pattern configuration of a communication system, wherein a communication device operating in the communication system affected by the transition from the first radiation pattern configuration to the second radiation pattern configuration is capable of detecting the transition so as to react accordingly, the method comprising the steps of:

determining antenna beams of the communication system affected by the transition from the first radiation pattern configuration to the second radiation pattern configuration; and altering the radiation pattern of the antenna beams determined to be affected by the transition over a period of time determined to be sufficient to allow said communication device to detect the transition without service interruption, wherein altering the radiation pattern includes alternating radiation of a signal of the first radiation pattern configuration with radiation of a signal of the second radiation pattern configuration within the antenna beams determined to be affected by the transition.

2. The method of claim 1 further comprising the step of:
adjusting the communication device during the transition to operate with the altered second radiation pattern configuration.

3. The method of claim 1 wherein said altering step comprises the step of:
providing a communication condition detectable at the communication device without specifically adapting the communication device for use within the method.

4. The method of claim 1 wherein the communication device is selected from the group consisting of:
a mobile radio unit;
a base station radio unit;
a cellular telephone;
a pager; and
a personal communication services device.

5. The method of claim 1 wherein if the antenna beams determined to be affected by the transition include more than one antenna beam, the altering step comprises the step of:
concurrently altering the antenna beams such that a second antenna beam is simultaneously altered with a first antenna beam.

6. The method of claim 1 wherein if the antenna beams determined to be affected by the transition include more than one antenna beam, the altering step comprises the step of:
sequentially altering the antenna beams such that the radiation of a second antenna beam is altered after completion of the altering of a first antenna beam.

7. The method of claim 1 wherein if the antenna beams determined to be affected by the transition include more than one antenna beam, the altering step comprises the step of:
cascading the altering of the antenna beams such that the start of altering a second antenna beam begins after the start of the altering of a first antenna beam, and wherein the starting the altering of the second antenna beam is before finishing the altering of the first antenna beam.

8. The method of claim 1 wherein the altering step further comprises the step of:
radiating the signal of the second radiation pattern configuration within the antenna beams determined to be affected by the transition after the time determined to be sufficient to allow a communication device to detect the transition has been met.

9. The method of claim 1 wherein the alternating step includes the step of:
reducing a dwell time of alternated radiation of the signal of the first radiation pattern configuration while increasing a dwell time of alternated radiation of the signal of the second radiation pattern configuration.

10. The method of claim 9 wherein if the antenna beams determined to be affected by the transition include more than one antenna beam, the alternating step further comprises the step of:
reducing the dwell time of alternated radiation of the signal of a first antenna beam discrete from reducing the dwell time of alternated radiation of the signal of the second antennal beam.

11. The method of claim 1 wherein the determining step determines a first antenna beam to decrease in radiation amplitude and a second antenna beam to increase in radiation amplitude.

12. The method of claim 11 wherein the altering step comprises the step of:
decreasing radiation amplitude of the first antenna beam while increasing radiation amplitude of the second antenna beam.

13. The method of claim 12 wherein the altering step further comprising the step of:
radiating the signal of the second radiation pattern configuration within the antenna beams determined to be affected by the transition after the time determined to be sufficient to allow a communication device to detect the transition has been met.

14. The method of claim 1 wherein the altering step comprises the step of:
varying the signal of the first radiation pattern configuration within the antenna beams determined to be affected by the transition until the second radiation pattern configuration has been substantially met, wherein varying the signal creates nulls and peaks in the radiation pattern configuration utilized to emulate characteristics of the second radiation pattern configuration.

15. The method of claim 14 wherein the altering step further comprising the step of:

radiating the signal of the second radiation pattern configuration within the antenna beams determined to be affected by the transition after the time determined to be sufficient to allow a communication device to detect the transition has been met.

16. The method of claim 11 wherein the altering step includes at least two steps selected from the group consisting of:

alternating radiation of a signal of the first radiation pattern configuration with radiation of a signal of the second radiation pattern configuration within the antenna beams determined to be affected by the transition;

decreasing radiation amplitude of the first antenna beam while increasing radiation amplitude of the second antenna beam;

radiating a composite signal within the antenna beams determined to be affected by the transition, wherein the composite signal simultaneously provides a signal of the first radiation pattern configuration and a signal of the second radiation pattern configuration; and varying the signal of the first radiation pattern configuration within the antenna beams determined to be affected by the transition until the second radiation pattern configuration has been substantially met, wherein varying the signal creates nulls and peaks in the radiation pattern configuration utilized to emulate characteristics of the second radiation pattern configuration.

17. A communication system wherein electronic signals are communicated within a plurality of radiation patterns associated with a predefined area of the communication system as electromagnetic waves, the communication system comprising:

a radiation pattern transducer operable to transduce energy between the electronic signals and the electromagnetic waves;

a signal manipulator for controllably coupling the electronic signals between the radiation pattern transducer and a communication apparatus; and a controller for controlling the signal manipulator to allow for a modification from a first configuration of the radiation patterns to a second configuration of the radiation patterns, wherein control of the signal manipulator is conducted so that a communication device in the communication system may detect the modification as it is implemented, wherein said controller includes an instruction set which defines operation of the signal manipulator so that a first radiation pattern having an assignment in the first configuration of radiation patterns different than an assignment in the second configuration of radiation patterns and a second radiation pattern having an assignment in the first configuration of radiation patterns same as an assignment in the second configuration of radiation patterns are reoriented by moving a null between the first and second radiation patterns.

18. The communication system of claim 17 wherein control of the signal manipulator is selected to allow a communication device in the communication system to detect the modification from the first configuration of the radiation patterns to the second configuration of the radiation patterns according to the communication device's standard operating algorithm.

19. The method of claim 17 wherein the communication device is selected from the group consisting of:

a mobile radio unit;

a base station radio unit;

a cellular telephone;

a pager; and a personal communication services device.

20. The communication system of claim 17 wherein the radiation pattern transducer comprises:

a beam forming matrix, wherein the beam forming matrix receives the electronic signals from the signal manipulator and combines them to form a plurality of radiation signals; and an array of antennas, wherein each antenna of the array of antennas receives a particular radiation signal of the plurality of radiation signals and radiates the signals to form at least a part of the plurality of radiation patterns.

21. The communication system of claim 17 wherein the said controller includes a processor-based system.

22. The communication system of claim 17 wherein said controller also includes an instruction set which defines operation of the signal manipulator so that a radiation pattern having an assignment in the first configuration of radiation patterns different than an assignment in the second configuration of radiation patterns alternates between the first assignment and the second assignment.

23. The communication system of claim 22 wherein the signal manipulator comprises circuitry selected from the group consisting of:

at least one controllable switch matrix; and a plurality of controllable attenuators.

24. The communication system of claim 17 wherein said controller also includes an instruction set which defines operation of the signal manipulator so that a first radiation pattern having an assignment in the first configuration of radiation patterns different than an assignment in the second configuration of radiation patterns decreases in amplitude while a second radiation pattern having an assignment in the first configuration of radiation patterns same as an assignment in the second configuration of radiation patterns increases in amplitude.

25. The communication system of claim 24 wherein the signal manipulator comprises a plurality of controllable attenuators.

26. The communication system of claim 17 wherein said controller also includes an instruction set which defines operation of the signal manipulator so that a radiation pattern having an assignment in the first configuration of radiation patterns different than an assignment in the second configuration of radiation patterns combines the first assignment with the second assignment.

27. The communication system of claim 26 wherein the signal manipulator comprises circuitry selected from the group consisting of:

at least one controllable switch matrix; and a plurality of controllable attenuators.

28. The communication system of claim 17 wherein the signal manipulator comprises circuitry selected from the group consisting of:

a plurality of controllable switch matrixes and a plurality of phase shifters; and a controllable beam forming matrix.

29. The communication system of claim 28 wherein the beam forming matrix includes a Butler Matrix.

30. The communication system of claim 17 wherein the controller also includes an instruction set which defines operation of the signal manipulator so that first radiation pattern having an assignment in the first configuration of radiation patterns different than an assignment in the second configuration of radiation patterns decreases in amplitude while a second radiation pattern having an assignment in the first configuration of radiation patterns same as an assignment in the second configuration of radiation patterns increases in amplitude, and wherein the instruction set defines operation of the signal manipulator so that the first radiation pattern having the assignment in the first configuration of radiation patterns different than the assignment in the second configuration of radiation patterns alternates between the first assignment and the second assignment.

31. The communication system of claim 17 wherein the controller also includes an instruction set which defines operation of the signal manipulator so that a first radiation pattern having an assignment in the first configuration of radiation patterns different than an assignment in the second configuration of radiation patterns decreases in amplitude while a second radiation pattern having an assignment in the first configuration of radiation patterns same as an assignment in the second configuration of radiation patterns increases in amplitude, and wherein the instruction set defines operation of the signal manipulator so that the first radiation pattern having the assignment in the first configuration of radiation patterns different than the assignment in the second configuration of radiation patterns combines the first assignment with the second assignment.

32. The communication system of claim 17 wherein the controller also includes an instruction set which defines operation of the signal manipulator so that a radiation pattern having an assignment in the first configuration of radiation patterns different than an assignment in the second configuration of radiation patterns alternates between the first assignment and the second assignment, and wherein the instruction set defines operation of the signal manipulator so that the radiation pattern having the assignment in the first configuration of radiation patterns different than the assignment in the second configuration of radiation patterns combines the first assignment with the second assignment.

33. A communication system for transforming a first array of antenna beams into a second array of antenna beams, wherein a communication device within the communication system is affected by the transformation, wherein the transforming of the antenna beams is detectable by the communication device, the communication system comprising:
  means for determining antenna beams of the communication system to implement the transformation; and
  means operable over a time determined to be sufficient to allow a communication device to detect the transformation for manipulating the antenna beams determined to be affected by the transformation, wherein said manipulating means communicates a signal of the first array of antenna beams within the antenna beams determined to be affected by the transformation before manipulation of the antenna beams and communicates a signal of the second array of antenna beams within the antenna beams determined to be affected by the transformation after manipulation of the antenna beams.

34. The communication system of claim 33 further comprising:
  means for adjusting the communication device during the transformation to operate with the second radiation pattern configuration.

35. The communication system of claim 33 wherein the means for manipulating comprises:
  means for providing a communication condition detectable at the communication device without specifically adapting the communication device for use within the transformation.

36. The communication system of claim 33 wherein the communication device is selected from the group consisting of:
  a mobile radio unit;
  a base station radio unit;
  a cellular telephone;
  a pager; and
  a personal communication services device.

37. The communication system of claim 33 wherein if the antenna beams determined to be affected by the transformation include more than one antenna beam, the means for manipulating comprises:
  means for concurrently manipulating the antenna beams, wherein the concurrently manipulating means provides manipulating radiation of a second antenna beam simultaneously with manipulating radiation of a first antenna beam.

38. The communication system of claim 33 wherein if the antenna beams determined to be affected by the transformation include more than one antenna beam, the means for manipulating comprises:
  means for sequentially manipulating the antenna beams, wherein the sequentially manipulating means provides manipulating radiation of a second antenna beam after completion of manipulating radiation of a first antenna beam.

39. The communication system of claim 33 wherein if the antenna beams determined to be affected by the transformation include more than one antenna beam, the means for manipulating comprises:
  means for cascading the manipulating of the antenna beams, wherein the cascading means provides starting the manipulating of the radiation of a second antenna beam after starting the manipulating of the radiation of a first antenna beam, and wherein starting the manipulating of the radiation of the second antenna beam is before finishing the manipulating of the radiation of the first antenna beam.

40. The communication system of claim 33 wherein the means for manipulating comprises:
  means for alternating radiation of the signal of the first array of antenna beams with radiation of the signal of the second array of antenna beams within the antenna beams determined to be affected by the transformation.

41. The communication system of claim 40 wherein the means for manipulating further comprises:
  means for radiating the signal of the second radiation pattern configuration within the antenna beams determined to be affected by the transformation after the time determined to be sufficient to allow a communication device to detect the transformation has been met.

42. The communication system of claim 40 wherein the means for alternating includes:
  means for reducing a dwell time of alternated radiation of the signal of the first array of antenna beams while increasing a dwell time of alternated radiation of the signal of the second radiation pattern configuration.

43. The communication system of claim 42 wherein if the antenna beams determined to be affected by the transformation include more than one antenna beam, the means for alternating further comprises:

means for reducing the dwell time of alternated radiation of the signal of a first antenna beam discrete from reducing the dwell time of alternated radiation of a signal of a second antennal beam.

44. The communication system of claim 33 wherein the means for determining determines a first antenna beam that is to be decreased in amplitude and a second antenna beam that is to be increased in amplitude.

45. The communication system of claim 44 wherein the means for manipulating comprises:

means for decreasing amplitude of the first antenna beam while increasing amplitude of the second antenna beam.

46. The communication system of claim 45 wherein the means for manipulating further comprises:

means for radiating the signal of the second array of antenna beams within the antenna beams determined to be affected by the transformation after the time determined to be sufficient to allow a communication device to detect the transformation has been met.

47. The communication system of claim 33 wherein the means for manipulating comprises:

means for radiating a composite signal within the antenna beams determined to be affected by the transformation, wherein the composite signal includes the radiation of the signal of the first array of antenna beams and the signal of the second array of antenna beams.

48. The communication system of claim 47 wherein the means for manipulating further comprises:

means for radiating the signal of the second array of antenna beams within the antenna beams determined to be affected by the transformation after the time determined to be sufficient to allow a communication device to detect the transformation has been met.

49. The communication system of claim 33 wherein the means for manipulating comprises:

means for varying the signal of the first array of antenna beams within the antenna beams determined to be affected by the transformation until the second array of antenna beams has been substantially emulated, wherein varying the signal creates nulls and peaks in the radiation pattern configuration.

50. The communication system of claim 49 wherein the means for manipulating further comprises:

means for radiating the signal of the second array of antenna beams within the antenna beams determined to be affected by the transformation after the time determined to be sufficient to allow a communication device to detect the transformation has been met.

51. The communication system of claim 44 wherein the means for manipulating comprises:

at least two embodiments selected from the group consisting of:

means for alternating radiation of a signal of the first array of antenna beams with radiation of a signal of the second array of antenna beams within the antenna beams determined to be affected by the transformation;

means for decreasing radiation amplitude of the first antenna beam while increasing radiation amplitude of the second antenna beam;

means for radiating a composite signal within the antenna beams determined to be affected by the transformation, wherein the composite signal provides simultaneously transmitting the radiation of the signal of the first array of antenna beams and the signal of the second array of antenna beams; and means for varying the signal of the first array of antenna beams within the antenna beams determined to be affected by the transformation until the second array of antenna beams has been substantially met, wherein varying the signal creates nulls and peaks in the radiation pattern configuration.

52. A sector shaping transition system, wherein a plurality of input signals are converted to electromagnetic waves forming a plurality of radiation patterns associated with a predefined area of said transition system, said transition system comprising:

an array of antennas, wherein said array of antennas converts a plurality of radiation signals into said electromagnetic waves resulting in said plurality of radiation patterns;

a beam forming matrix coupled to said array of antennas, wherein said beam forming matrix combines said plurality of input signals into said plurality of radiation signals, said beam forming matrix directs said plurality of radiation signals to said array of antennas;

a controllable switching instrument coupled to said beam forming matrix, wherein said controllable switching instrument receives said plurality of input signals from a communication apparatus and controllably directs said plurality of input signals to said beam forming matrix; and a processor based system coupled to said controllable switch instrument, wherein said processor based system provides a control signal to said controllable switching instrument, said control signal controls said controllable switching instrument to direct said plurality of input signals to said beam forming matrix to result in said plurality of radiation patterns transforming from a first radiation pattern configuration to a second radiation pattern configuration, said transforming is conducted so that a cellular telephone in said transition system which is affected by said transformation may detect said alteration without being adapted by a user.

53. The transition system of claim 52 wherein said controllable switching instrument comprises:

a plurality of (1×N) switch matrixes, wherein the number of (1×N) switch matrixes in said plurality of (1×N) switch matrixes is equal to the number of said input signals in said plurality of input signals, and wherein N is equal to the number of radiation patterns in said plurality of radiation patterns.

54. The transition system of claim 53 wherein said beam forming matrix comprises:

a plurality of signal combiners, wherein the number of signal combiners in said plurality of signal combiners is equal to N, and wherein each signal combiner in said plurality of signal combiners is coupled to each (1×N) switch matrix in said plurality of (1×N) switch matrixes.

55. The transition system of claim 54 wherein said control signal controls said plurality of (1×N) switch matrixes so that a radiation pattern in said plurality of radiation patterns alternates between a first radiation pattern signal and a second radiation pattern signal.

56. The transition system of claim 55 wherein said control signal controls said plurality of (1×N) switch matrixes so that a radiation pattern in said plurality of radiation patterns combines a first radiation pattern signal with a second radiation pattern signal.

57. A sector shaping transition system wherein a plurality of input signals are converted to electromagnetic waves forming a plurality of radiation patterns associated with a predefined area of said transition system, said transition system comprising:
   an array of antennas; wherein said array of antennas converts a plurality of radiation signals into said electromagnetic waves resulting in said plurality of radiation patterns;
   a beam forming matrix coupled to said array of antennas, wherein said beam forming matrix combines said plurality of input signals into said plurality of radiation signals, said beam forming matrix directs said plurality of radiation signals to said array of antennas;
   a plurality of controllable manipulation devices coupled to said beam forming matrix;
   a splitter coupled to said plurality of controllable manipulation devices, wherein said splitter receives said plurality of input signals from a communication apparatus and directs said plurality of input signals to said beam forming matrix through said plurality of controllable manipulation device; and
   a processor based system coupled to said plurality of controllable manipulation devices, wherein said processor based system provides a control signal to said plurality of controllable manipulation devices to manipulate said plurality of input signals before being received by said beam forming matrix, wherein said control signal has the plurality of radiation patterns progress from a first radiation pattern configuration to a second radiation pattern configuration, said progression is conducted so that a cellular telephone in said transition system which is affected by said alteration may detect said alteration without being adapted by a user.

58. The transition system of claim 57 wherein said splitter comprises:
   a plurality of (1×N) switch matrixes, wherein the number of (1×N) switch matrixes in said plurality of (1×N) switch matrixes is equal to the number of input signals in said plurality of input signals, and wherein N is equal to the number of radiation patterns in said plurality of radiation patterns.

59. The transition system of claim 58 wherein said beam forming matrix comprises:
   a plurality of signal combiners, wherein the number of signal combiners in said plurality of signal combiners is equal to N.

60. The transition system of claim 59 wherein said plurality of controllable manipulation device comprises:
   a plurality of attenuators, wherein the number of attenuators in said plurality of attenuators is equal to N multiplied by M wherein M is the number of input signals in said plurality of input signals, and wherein each signal combiner is coupled to a group of M attenuators in said plurality of attenuators and each attenuator of said group of M attenuators is coupled to a separate switch matrix of said plurality of (1×N) switch matrixes.

61. The transition system of claim 60 wherein said control signal controls said attenuators so that a radiation pattern in said plurality of radiation patterns alternates between a first radiation pattern signal and a second radiation pattern signal.

62. The transition system of claim 60 wherein said control signal controls said attenuators so that a first radiation pattern signal in said plurality of radiation patterns increases in radiation amplitude while a second radiation pattern signal in said plurality of radiation patterns decreases in amplitude.

63. The transition system of claim 60 wherein said control signal controls said attenuators so that a radiation pattern in said plurality of radiation patterns combines a first radiation pattern signal with a second radiation pattern signal.

64. The transition system of claim 59 wherein said plurality of controllable manipulation device comprises:
   a plurality of phase shifters, wherein the number of phase shifters in said plurality of phase shifters is equal to N multiplied by M wherein M is the number of input signals in said plurality of input signals, and wherein each signal combiner is coupled to a group of M phase shifters in said plurality of phase shifters and each phase shifter of said group of M phase shifters is coupled to a separate switch matrix of said plurality of (1×N) switch matrixes.

65. The transition system of claim 64 wherein said control signal controls said phase shifters so that a first radiation pattern signal in said plurality of radiation patterns expands while a second radiation pattern signal said plurality of radiation patterns reduces, the expanding and reducing of the first and second radiation patterns are done by moving nulls of the two radiation patterns.

66. A method for transition from a first radiation pattern configuration to a second radiation pattern configuration of a communication system, wherein a communication device operating in the communication system affected by the transition from the first radiation pattern configuration to the second radiation pattern configuration is capable of detecting the transition so as to react accordingly, the method comprising the steps of:
   determining antenna beams of the communication system affected by the transition from the first radiation pattern configuration to the second radiation pattern configuration; and
   altering the radiation pattern of the antenna beams determined to be affected by the transition over a period of time determined to be sufficient to allow said communication device to detect the transition without service interruption, wherein if the antenna beams determined to be affected by the transition include more than one antenna beam altering the radiation pattern includes sequentially altering the antenna beams such that the radiation of a second antenna beam is altered after completion of the altering of a first antenna beam.

67. A method for transition from a first radiation pattern configuration to a second radiation pattern configuration of a communication system, wherein a communication device operating in the communication system affected by the transition from the first radiation pattern configuration to the second radiation pattern configuration is capable of detecting the transition so as to react accordingly, the method comprising the steps of:
   determining antenna beams of the communication system affected by the transition from the first radiation pattern configuration to the second radiation pattern configuration; and
   altering the radiation pattern of the antenna beams determined to be affected by the transition over a period of time determined to be sufficient to allow said communication device to detect the transition without service interruption, wherein if the antenna beams determined to be affected by the transition include more than one antenna beam altering the radiation pattern includes cascading the altering of the antenna beams such that the start of altering a second antenna beam begins after the start of the altering of a first antenna beam, and wherein the starting the altering of the second antenna beam is before finishing the altering of the first antenna beam.

68. A method for transition from a first radiation pattern configuration to a second radiation pattern configuration of a communication system, wherein a communication device operating in the communication system affected by the transition from the first radiation pattern configuration to the second radiation pattern configuration is capable of detecting the transition so as to react accordingly, the method comprising the steps of:

determining antenna beams of the communication system affected by the transition from the first radiation pattern configuration to the second radiation pattern configuration; and altering the radiation pattern of the antenna beams determined to be affected by the transition over a period of time determined to be sufficient to allow said communication device to detect the transition without service interruption, wherein altering the radiation pattern includes radiating a composite signal within the antenna beams determined to be affected by the transition, wherein the composite signal simultaneously provides a signal of the first radiation pattern configuration and a signal of the second radiation pattern configuration.

69. The method of claim 68 wherein the altering step further comprising the step of:

radiating the signal of the second radiation pattern configuration within the antenna beams determined to be affected by the transition after the time determined to be sufficient to allow a communication device to detect the transition has been met.

70. A method for transition from a first radiation pattern configuration to a second radiation pattern configuration of a communication system, wherein a communication device operating in the communication system affected by the transition from the first radiation pattern configuration to the second radiation pattern configuration is capable of detecting the transition so as to react accordingly, the method comprising the steps of:

determining antenna beams of the communication system affected by the transition from the first radiation pattern configuration to the second radiation pattern configuration; and altering the radiation pattern of the antenna beams determined to be affected by the transition over a period of time determined to be sufficient to allow said communication device to detect the transition without service interruption, wherein altering the radiation pattern includes varying the signal of the first radiation pattern configuration within the antenna beams determined to be affected by the transition until the second radiation pattern configuration has been substantially met, wherein varying the signal creates nulls and peaks in the radiation pattern configuration utilized to emulate characteristics of the second radiation pattern configuration.

71. The method of claim 70 wherein the altering step further comprising the step of:

radiating the signal of the second radiation pattern configuration within the antenna beams determined to be affected by the transition after the time determined to be sufficient to allow a communication device to detect the transition has been met.

72. A communication system wherein electronic signals are communicated within a plurality of radiation patterns associated with a predefined area of the communication system as electromagnetic waves, the communication system comprising:

a radiation pattern transducer operable to transduce energy between the electronic signals and the electromagnetic waves;

a signal manipulator for controllably coupling the electronic signals between the radiation pattern transducer and a communication apparatus; and a controller for controlling the signal manipulator to allow for a modification from a first configuration of the radiation patterns to a second configuration of the radiation patterns, wherein control of the signal manipulator is conducted so that a communication device in the communication system may detect the modification as it is implemented, wherein said controller includes an instruction set which defines operation of the signal manipulator so that a radiation pattern having an assignment in the first configuration of radiation patterns different than an assignment in the second configuration of radiation patterns alternates between the first assignment and the second assignment.

73. The communication system of claim 72 wherein the signal manipulator comprises circuitry selected from the group consisting of:

at least one controllable switch matrix; and a plurality of controllable attenuators.

74. A communication system wherein electronic signals are communicated within a plurality of radiation patterns associated with a predefined area of the communication system as electromagnetic waves, the communication system comprising:

a radiation pattern transducer operable to transduce energy between the electronic signals and the electromagnetic waves;

a signal manipulator for controllably coupling the electronic signals between the radiation pattern transducer and a communication apparatus; and a controller for controlling the signal manipulator to allow for a modification from a first configuration of the radiation patterns to a second configuration of the radiation patterns, wherein control of the signal manipulator is conducted so that a communication device in the communication system may detect the modification as it is implemented, wherein said controller also includes an instruction set which defines operation of the signal manipulator so that a radiation pattern having an assignment in the first configuration of radiation patterns different than an assignment in the second configuration of radiation patterns combines the first assignment with the second assignment.

75. The communication system of claim 74 wherein the signal manipulator comprises circuitry selected from the group consisting of:

at least one controllable switch matrix; and a plurality of controllable attenuators.

* * * * *